US006956593B1

(12) United States Patent  
Gupta et al.

(10) Patent No.: US 6,956,593 B1  
(45) Date of Patent: Oct. 18, 2005

(54) USER INTERFACE FOR CREATING, VIEWING AND TEMPORALLY POSITIONING ANNOTATIONS FOR MEDIA CONTENT

(75) Inventors: Anoop Gupta, Woodinville, WA (US); David M. Bargeron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/396,706

(22) Filed: Sep. 15, 1999

Related U.S. Application Data

(60) Provisional application No. 60/100,452, filed on Sep. 15, 1998.

(51) Int. Cl.[7] .............................................. G09G 5/00
(52) U.S. Cl. ..................................... 345/751; 345/733
(58) Field of Search ........................ 345/704, 719–723, 345/733, 751–753, 760, 968; 707/101–102, 3, 500.1, 501.1; 709/204–205

(56) References Cited

U.S. PATENT DOCUMENTS

| | | |
|---|---|---|
| 4,649,499 A | 3/1987 | Sutton et al. |
| 5,333,266 A | 7/1994 | Boaz et al. |
| 5,524,193 A | 6/1996 | Covington et al. |
| 5,526,407 A | 6/1996 | Russell et al. |
| 5,572,643 A | 11/1996 | Judson |
| 5,583,980 A * | 12/1996 | Anderson ................... 345/473 |
| 5,600,775 A | 2/1997 | King et al. |
| 5,633,916 A | 5/1997 | Goldhagen et al. |
| 5,699,089 A | 12/1997 | Murray |
| 5,732,216 A | 3/1998 | Logan et al. |
| 5,809,250 A * | 9/1998 | Kisor ........................ 709/224 |
| 5,838,313 A | 11/1998 | Hou et al. |
| 5,893,087 A | 4/1999 | Wlaschin et al. |
| 5,893,110 A * | 4/1999 | Weber et al. .................. 707/1 |

(Continued)

FOREIGN PATENT DOCUMENTS

| | | |
|---|---|---|
| EP | O 651 126 A1 | 4/1995 |
| GB | 2 301 260 A | 11/1996 |
| WO | WO 97/49251 | 12/1997 |

OTHER PUBLICATIONS

Merriam Webster's Collegiate Dictionary; Tenth Edition; 1996; 5 pages.

Carrer, et al.; "An Annotation Engine for Supporting Video Database Population"; Multimedia Tools and Applications; 1997; pp. 1–30.

Chen, et al.; "Video and Audio: Organization and Retrieval in the WWW"; Available at http://vosaic.com/corp/papers/www5.html; Archived Jan. 28, 1998.

John D. Gabbe, Allen Ginsberg, Bethany S. Robinson, "Towards Intelligent Recognition of Multimedia Episodes in Real–Time Applications", 1994 ACM, pp. 227–236.

Roscheisen et al., "Shared Web Annotations as a Platform for Third–Party Value–Added, Information Providers: Architecture, Protocols, and Usage Examples", Technical Report CSDTR/DLTR 1997, Stanford University, Available at http://www.diglib.stanford.edu/rmr/TR/TR.html.

Phelps et al., "Multivalent Annotations, Proceedings of the First European Conference on Research and Advanced Technology for Digital Libraries", Pisa, Italy, Sep. 1997.

(Continued)

Primary Examiner—Sy D. Luu  
(74) Attorney, Agent, or Firm—Lee & Hayes, PLLC

(57) ABSTRACT

In a networked client/server system, media content as well as annotations corresponding to the media content can be transmitted from a server(s) to a client. A user interface is presented to the user to facilitate creating new annotations and viewing annotations. According to one embodiment, the client further assists the user in identifying a temporal range of the media content to which the new annotation is to correspond.

50 Claims, 17 Drawing Sheets

U.S. PATENT DOCUMENTS

| | | | |
|---|---|---|---|
| 5,903,892 A | | 5/1999 | Hoffert et al. |
| 5,923,848 A | | 7/1999 | Goodhand et al. |
| 5,969,716 A | * | 10/1999 | Davis et al. ................ 345/704 |
| 5,991,365 A | | 11/1999 | Pizano et al. |
| 6,006,241 A | | 12/1999 | Purnaveja et al. |
| 6,009,462 A | | 12/1999 | Birrell et al. |
| 6,081,829 A | | 6/2000 | Sidana |
| 6,085,185 A | * | 7/2000 | Matsuzawa et al. ........... 707/1 |
| 6,105,055 A | | 8/2000 | Pizano et al. |
| 6,144,375 A | | 11/2000 | Jain et al. |
| 6,173,287 B1 | | 1/2001 | Eberman et al. |
| 6,173,317 B1 | | 1/2001 | Chaddha et al. |
| 6,230,172 B1 | | 5/2001 | Purnaveja et al. |
| 6,311,189 B1 | * | 10/2001 | deVries et al. ............... 707/102 |
| 6,317,141 B1 | * | 11/2001 | Pavley et al. ................ 345/723 |
| 6,332,144 B1 | * | 12/2001 | deVries et al. ............... 707/102 |
| 6,360,234 B2 | * | 3/2002 | Jain et al. ................. 707/500.1 |
| 6,366,296 B1 | * | 4/2002 | Boreczky et al. ........... 345/716 |
| 6,438,566 B1 | | 8/2002 | Okuno et al. |
| 6,449,653 B2 | | 9/2002 | Klemets et al. |
| 6,452,615 B1 | | 9/2002 | Chiu et al. |
| 6,484,156 B1 | | 11/2002 | Gupta et al. |
| 6,571,295 B1 | | 5/2003 | Sidana |
| 6,584,479 B2 | | 6/2003 | Chang et al. |

OTHER PUBLICATIONS

Schickler et al., "Pan–Browser Support for Annotations and Other Meta Information on the World Wide Web", Proceedings of the Fifth International World Wide Web Conference, Paris, France, May 1996, available at http://www5conf.inria.fr/fich_html/papers/p15/Overview.html.

Bugaj et al., "Synchronized Multimedia Integration Language (SMIL) 1.0 Specification," http://www.w3.org/TR/1998/REC-smil-19980615, Jun. 1998, 40 pages.

Pizano and Hou, "Integrated multimedia messaging concepts and applications," ACM Press, 1996, 8 pages.

Nerney, "RealNetworks unveils software line for multimedia displays," Network World Fusion, May 1998.

Abowd et al., "Teaching and Learning as Multimedia Authoring: The Classroom 2000 Project", Proceedings of the Multimedia '96, Boston, MA, USA, Nov. 1996, ACM Press, pp. 187–198.

Bessler et al., DIANE: A Multimedia Annotation System, Proceedings of the ECMAST '97, Milan, Italy, May 1997.

Carrer et al., "An Annotation Engine for Supporting Video Database Population", Multimedia Tools and Applications 5, 1997, Kluwer Academic Publishers, pp. 233–258.

Chalfonte et al., "Expressive Richness: A Comparison of Speech and Text as Media for Revision", Proceedings of the CHI' 91, 1991, ACM Press, pp. 21–26.

Davis et al., CoNote System Overview, 1995, Available at http://www.cs.cornell.edu/home/dph/annotation/annotations.html.

Gaines et al., "Open Architecture Multimedia Documents", Proceedings of the Multimedia '93, Anaheim, CA, Aug. 1993, ACM Press, pp. 137–46.

Gould et al., "Relativity Controller: Reflecting User Perspective in Document Spaces," Adjunct Proceedings of INTERCHI '93, 1993, ACM Press, pp. 125–126.

Kim et al., "VIRON: An Annotation–Based Video Information Retrieval System," Proceedings of COMPSAC '96, Seoul, South Korea, Aug. 1996, IEEE Press, pp. 298–303.

Laliberte et al., "A Protocol for Scalable Group and Public Annotations", 1997 NCA Technical Proposal, available at http://union.ncsa.uiuc.edu/~liberte/www/scalable-annotations.html.

Lawton et al., "The Knowledge Weasel Hypermedia Annotation System", Proceedings of the HyperText '93, Nov. 1993, ACM Press, pp. 106–117.

Lee et al., "Video Indexing—An Approach Based on Moving Object and Track", Proceedings of the SPIE, vol. 1908, pp. 25–36.

Marshall, "Toward and Ecology of Hypertext Annotations", Proceedings of the HyperText, Pittsburgh, PA, Jun. 1998, ACM Press, pp. 40–48.

Neuwirth et al., "Distributed Collaborative Writing: A Comparison of Spoken and Written Modalities for Reviewing and Revising Documents", Proceedings of the CHI '94, Boston, MA, Apr. 1994, ACM Press, pp. 51–57.

Smith et al., "What Should a Wildebeest Say? Interactive Nature Films for High School Classrooms", Proceedings of the ACM Multimedia '97, Seattle, WA, Nov. 1997, ACM Press, pp. 193–201.

Smith, M., "DynaText: An Electronic Publishing System", Computers and the Humanities 27, 1993, pp. 415–420.

Stanford Online: Masters in Electrical Engineering, http://scpd.stanford.edu/cee/telecom/onlinedegree.html.

Weber et al., "Marquee: A Tool for Real–Time Video Logging", Proceedings of the CHI '94, Boston MA, Apr. 1994, ACM Press, pp. 58–64.

Wei, S.X., "MediaWeaver—A Distributed Media Authoring System for Networked Scholarly Workspaces", Multimedia Tools and Applications 6, 1998, Kluwer Academic Publishers, pp. 97–111.

Roscheisen et al., "Beyond Browsing: Shared Comments, SOAPs, Trails, and On–Line Communities", Computer Networks and ISDN Systems 27, 1995, pp. 739–749.

"Mastering Microsoft Office 97", Mosely and Boodey, SYBEX, Inc., 1996, pp. 755–763 and pp. 811–816.

* cited by examiner

Annotation Entry
180

| |
|---|
| Author 182 |
| Time Range 184 |
| Time Units 186 |
| Creation Time 188 |
| Title 190 |
| Content 192 |
| Annotation Identifier 194 |
| Related Annotation Identifier 196 |
| Set Identifier(s) 198 |
| Media Content Identifier 200 |
| Property Fields 202 |
| Sequence Number 204 |

*Fig. 4*

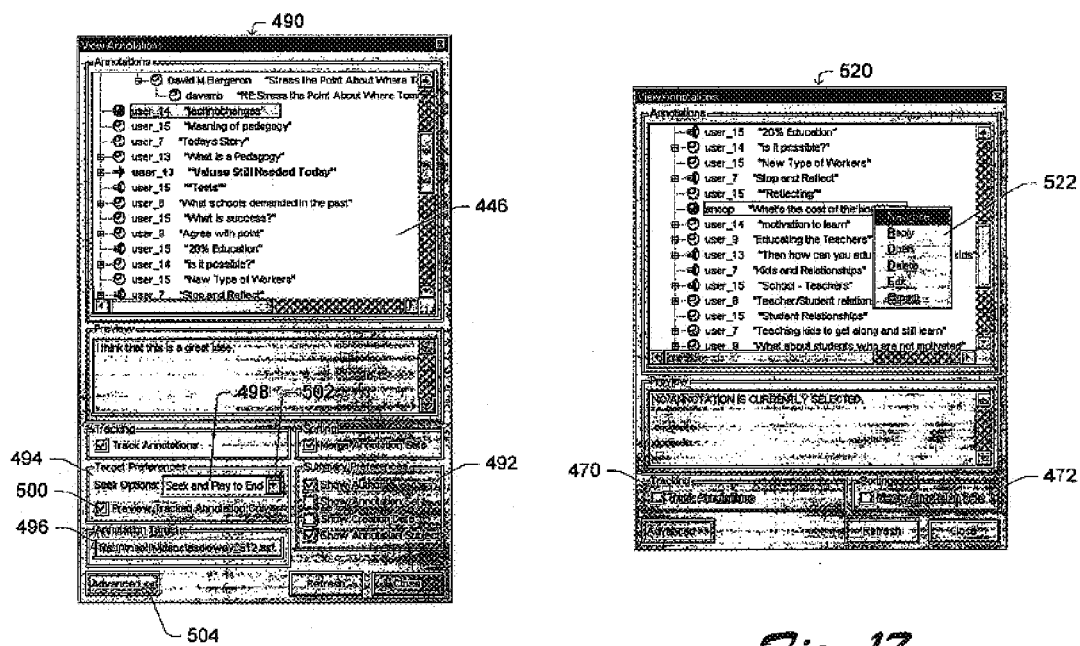

USER INTERFACE FOR CREATING, VIEWING AND TEMPORALLY POSITIONING ANNOTATIONS FOR MEDIA CONTENT

RELATED APPLICATIONS

This application claims priority to U.S. Provisional Application No. 60/100,452, filed Sep. 15, 1998, entitled "Annotations for Streaming Video on the Web: System Design and Usage", to Anoop Gupta and David M. Bargeron.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to networked client/server systems and to annotating media content in such systems. More particularly, the invention relates to creating, viewing, and temporally positioning annotations for media content.

BACKGROUND OF THE INVENTION

The advent of computers and their continued technological advancement has revolutionized the manner in which people work and live. An example of such is in the education field, wherein educational presentations (e.g., college lectures, workplace training sessions, etc.) can be provided to a computer user as multimedia data (e.g., video, audio, text, and/or animation data). Today, such presentations are primarily video and audio, but a richer, broader digital media era is emerging. Educational multimedia presentations provide many benefits, such as allowing the presentation data to be created at a single time yet be presented to different users at different times and in different locations throughout the world.

These multimedia presentations are provided to a user as synchronized media. Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated gif file, text can change and move, and animation and digital effects can happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as needed basis, rather than being pre-delivered in its entirety before playback. Thus, the client computer renders streaming data as it is received from a network server, rather than waiting for an entire "file" to be delivered.

Multimedia presentations may also include "annotations" relating to the multimedia presentation. An annotation is data (e.g., audio, text, video, etc.) that corresponds to a multimedia presentation. Annotations can be added by anyone with appropriate access rights to the annotation system (e.g., the lecturer/trainer or any of the students/trainees). These annotations typically correspond to a particular temporal location in the multimedia presentation and can provide a replacement for much of the "in-person" interaction and "classroom discussion" that is lost when the presentation is not made "in-person" or "live". As part of an annotation, a student can comment on a particular point, to which another student (or lecturer) can respond in a subsequent annotation. This process can continue, allowing a "classroom discussion" to occur via these annotations.

In the past, there has been little development of a coherent interface to ensure a high-quality user experience in creating and viewing annotations. The invention described below addresses the user experience by providing a user-friendly interface for creating and viewing annotations for multimedia presentations.

SUMMARY OF THE INVENTION

In a networked client/server system, media content as well as annotations corresponding to the media content can be transmitted from a server(s) to a client. A user interface is presented to the user to facilitate creating new annotations and viewing annotations.

According to one aspect of the invention, annotations correspond to a temporal range of the media content as defined by a temporal beginning point and a temporal ending point. When a user desires to create a new annotation the client assists the user in determining the temporal range of the media content to which the new annotation is to correspond. The client receives the user request to create the new annotation, which often times is made after the desired temporal beginning point for the new annotation has passed. The client analyzes the media content and detects likely beginning points for the new annotation and identifies these beginning points to the user. The user can then select one as the beginning point for the new annotation. Analogous assistance can be provided in determining the ending point for the new annotation.

According to another aspect of the invention, the user interface includes implicit information for use in creating and/or viewing annotations. For example, in one implementation annotations can belong to one or more different annotation sets. The user interface can be associated with selected ones of these different annotation sets, so that any newly created annotations automatically belong to that set, or annotation queries automatically query that set, without requiring the user to specify the set.

According to another aspect of the invention, the user interface includes multiple user-configurable buttons. The user can assign various actions to these buttons, such as the creation of new annotations with pre-identified subject lines, pre-defined content, pre-defined association with particular annotation sets, etc.

BRIEF DESCRIPTION OF THE DRAWINGS

The present invention is illustrated by way of example and not limitation in the figures of the accompanying drawings. The same numbers are used throughout the figures to reference like components and/or features.

FIG. 4 shows an exemplary structure for an, annotation entry that is maintained by the annotation server of FIG. 3.

FIGS. 15, 16, 17, and 18 illustrate exemplary dialog boxes for viewing annotations.

DETAILED DESCRIPTION

General Network Structure

Figure 1:
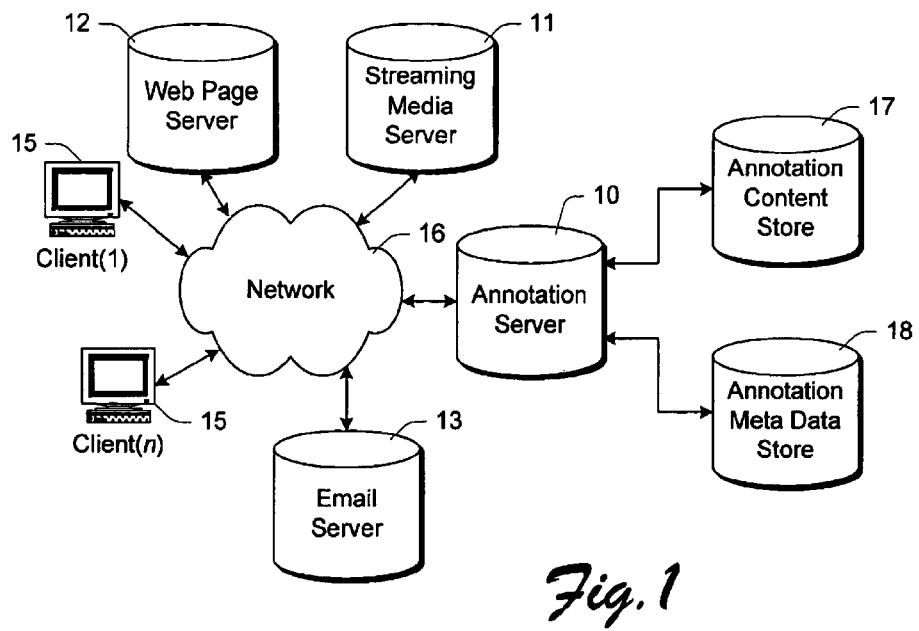
FIG. 1 shows a client/server network system and environment in accordance with the invention.

FIG. 1 shows a client/server network system and environment in accordance with the invention. Generally, the system includes multiple network server computers 10, 11, 12, and 13, and multiple (n) network client computers 15. The computers communicate with each other over a data communications network. The communications network in FIG. 1 comprises a public network 16 such as the Internet. The data communications network might also include, either in addition to or in place of the Internet, local-area networks and/or private wide-area networks.

Streaming media server computer 11 has access to streaming media content in the form of different media streams. These media streams can be individual media streams (e.g., audio, video, graphical, etc.), or alternatively composite media streams including two or more of such individual streams. Some media streams might be stored as files in a database or other file storage system, while other media streams might be supplied to the server on a "live" basis from other data source components through dedicated communications channels or through the Internet itself. Different versions of the same media content (e.g., low-resolution and high resolution versions) may be available to server computer 11.

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. Further details about ASF are available from Microsoft Corporation of Redmond, Wash.

Annotation server 10 controls the storage of annotations and their provision to client computers 15. The annotation server 10 manages the annotation meta data store 18 and the annotation content store 17. The annotation server 10 communicates with the client computers 15 via any of a wide variety of known protocols, such as the Hypertext Transfer Protocol (HTTP). The annotation server 10 can receive and provide annotations via direct contact with a client computer 15, or alternatively via electronic mail (email) via email server 13. The annotation server 10 similarly communicates with the email server 13 via any of a wide variety of known protocols, such as the Simple Mail Transfer Protocol (SMTP).

The annotations managed by annotation server 10 correspond to the streaming media available from media server computer 11. In the discussions to follow, the annotations are discussed as corresponding to streaming media. However, it should be noted that the annotations can similarly correspond to "pre-delivered" rather than streaming media, such as media previously stored at the client computers 15 via the network 16, via removable magnetic or optical disks, etc.

When a user of a client computer 15 accesses a web page containing streaming media, a conventional web browser of the client computer 15 contacts the web server 12 to request a Hypertext Markup Language (HTML) page. The client-based browser also submits requests to the media server 11 for streaming data, and the annotation server 10 for any annotations associated with the streaming data. When a user of a client computer 15 desires to add or retrieve annotations, the client computer 15 contacts the annotation server 10 to perform the desired addition/retrieval.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 2:
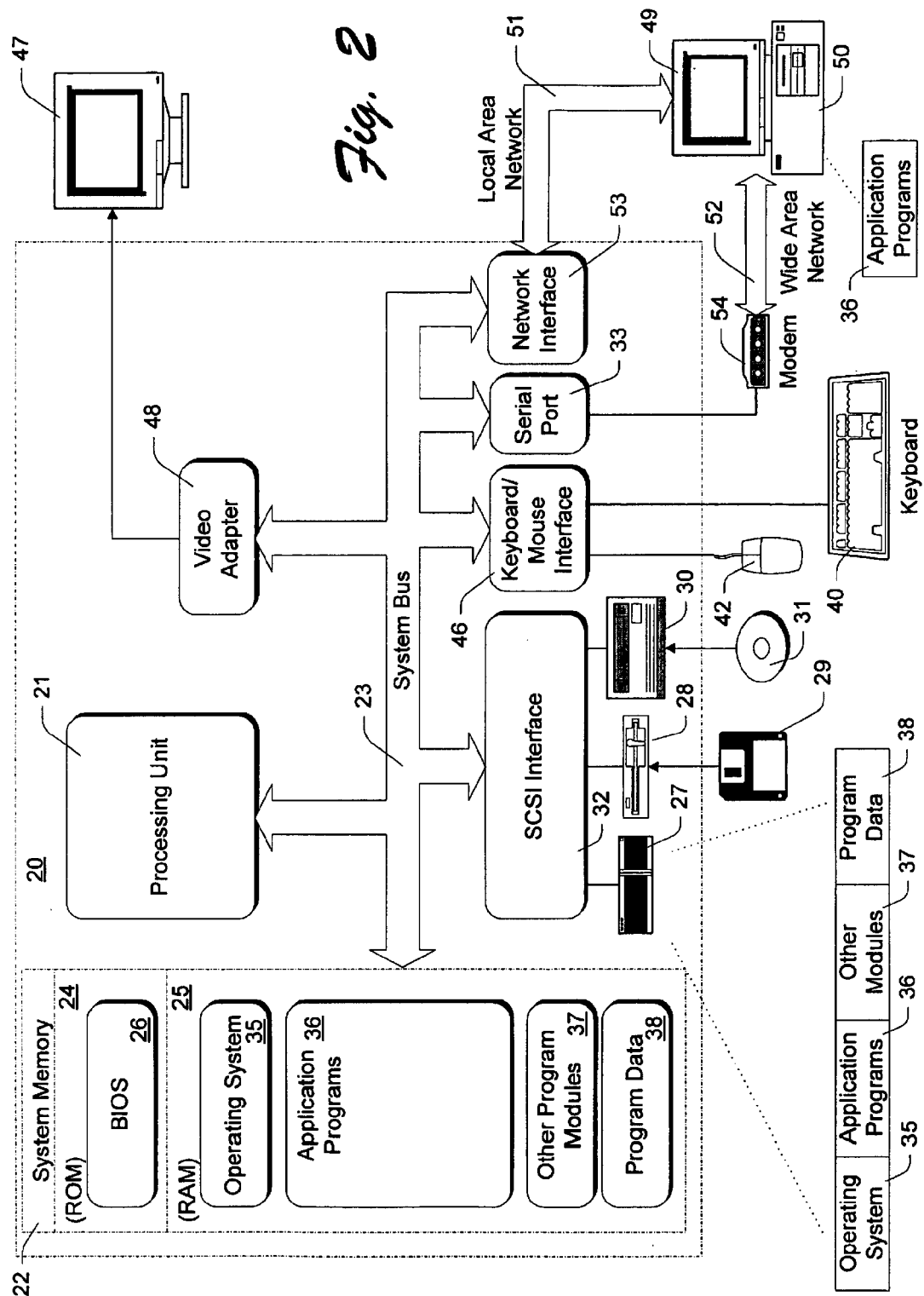
FIG. 2 shows a general example of a computer that can be used as a client or server in accordance with the invention.

FIG. 2 shows a general example of a computer 20 that can be used as a client or server in accordance with the invention. Computer 20 is shown as an example of a computer that can perform the functions of any of server computers 10–13 or a client computer 15 of FIG. 1.

Computer 20 includes one or more processors or processing units 21, a system memory 22, and a bus 23 that couples various system components including the system memory 22 to processors 21.

The bus 23 represents one or more of any of several types of bus structures, including a memory bus or memory controller, a peripheral bus, an accelerated graphics port, and a processor or local bus using any of a variety of bus architectures. The system memory includes read only memory (ROM) 24 and random access memory (RAM) 25. A basic input/output system (BIOS) 26, containing the basic routines that help to transfer information between elements within computer 20, such as during start-up, is stored in ROM 24. Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access 11 memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

Computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, remote computer 49 executes an Internet Web browser program such as the "Internet Explorer" Web browser manufactured and distributed by Microsoft Corporation of Redmond, Wash.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Client/Server Relationship

Figure 3:
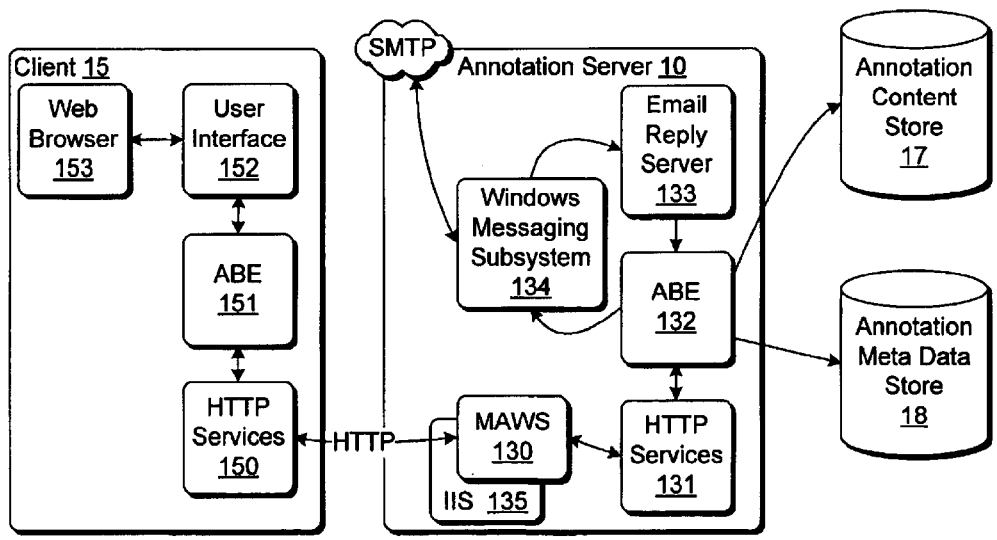
FIG. 3 illustrates an exemplary annotation server and client computer in more detail.

FIG. 3 illustrates an exemplary annotation server and client computer in more detail. As noted above, generally, commands are formulated at client computer 15 and forwarded to annotation server 10 via HTTP requests. In the illustrated embodiment of FIG. 3, communication between client 15 and server 10 is performed via HTTP, using commands encoded as Uniform Resource Locators (URLS) and data formatted as object linking and embedding (OLE) structured storage documents, or alternatively using Extensible Markup Language (XML).

Client 15 runs an HTTP services (HttpSvcs) module 150, which manages communication with server 10, and an annotation back end (ABE) module 151, which translates user actions into commands destined for server 10. A user interface (MMA) module 152 provides the user interface (UI) for a user to add and select different annotations, and be presented with the annotations. According to one implementation, the user interface module 152 supports ActiveX controls that display an annotation interface for streaming video on the Web.

Client 15 also executes a web browser module 153, which provides a conventional web browsing interface and capabilities for the user to access various servers via network 16 of FIG. 1. Web browser 153 also provides the interface for a user to select particular media streams for presentation. The user can select which one of different versions of multimedia content he or she wishes to receive from media server 11 of FIG. 1. This selection can be direct (e.g., entry of a particular URL or selection of a "low resolution" option), or indirect (e.g., entry of a particular desired playback duration or an indication of system capabilities, such as "slow system" or "fast system"). Alternatively, other media presentation interfaces could be used.

Annotation server 10 includes the Multimedia Annotation Web Server (MAWS) module 130, which is an Internet Services Application Programming Interface (ISAPI) plug-in for Internet Information Server (IIS) module 135 Together, these two modules provide the web server functionality of annotation server 10. Annotation server 10 also includes an HTTP Services module 131 which manages communication with client 15. In addition, annotation server 10 utilizes The Windows Messaging Subsystem 134 to facilitate communication with email server 13 of FIG. 1, and an email reply server 133 for processing incoming email received from email server 13.

Annotation server 10 further includes an annotation back end (ABE) module 132, which contains functionality for accessing annotation stores 17 and 18, for composing outgoing email based on annotation data, and for processing incoming email. Incoming email is received and passed to the ABE module 132 by the Email Reply Server 133. Annotation content authored at client 15, using user interface 152, is received by ABE 132 and maintained in annotation content store 17. Received meta data (control information) corresponding to the annotation content is maintained in annotation meta data store 18. The annotation content and meta data can be stored in any of a variety of conventional manners, such as in SQL relational databases (e.g., using Microsoft "SQL Server" version 7.0, available from Microsoft Corporation). Annotation server 10 is illustrated in FIG. 3 as maintaining the annotation content and associated control information (meta data) separately in two different stores. Alternatively, all of the annotation data (content and meta information) can be stored together in a single store, or content may be stored by another distinct storage system on the network 16 of FIG. 1, such as a file system, media server, email server, or other data store.

Each of the annotations maintained in annotation stores 17 and 18 corresponds to each of the different versions of particular multimedia content available to media server 11. Thus, regardless of the number of different versions of particular multimedia content available to media server 11, each annotation created by annotation server 10 is maintained as a single copy corresponding to all of these different versions.

Annotation Storage Structure

FIG. 4 shows an exemplary structure for an annotation entry 180 that is maintained by annotation server 10 in annotation meta data store 18 of FIG. 3. In the illustrated example, the annotation entry 180 includes an author field 182, a time range field 184, a time units field 186, a creation time field 188, a title field 190, a content field 192, an identifier field 194, a related annotation identifier field 196, a set identifier(s) field 198, a media content identifier field 200, an arbitrary number of user-defined property fields 202, and a sequence number 204. Each of fields 182–204 is a collection of data which define a particular characteristic of annotation entry 180.

Author field 182 contains data identifying the user who created annotation entry 180 and who is therefore the author of the annotation. The author is identified by ABE 151 of FIG. 3 based on the user logged into client 15 at the time the annotation is created.

Time range field 184 contains data representing "begin" and "end" times defining a segment of media timeline to which annotation entry 180 is associated. Time units field 186 contains data representing the units of time represented in time range field 184. Together, time range field 184 and time units field 186 identify the relative time range of the annotation represented by annotation entry 180. This relative time range corresponds to a particular segment of the media content to which annotation entry 180 is associated. The begin and end times for the annotation are provided by the user via interface 152 of FIG. 3, or alternatively can be automatically or implicitly derived using a variety of audio and video signal processing techniques, such as sentence detection in audio streams or video object tracking.

The begin and end times stored in time range field 184 reference the version of the media content being played back when annotation entry 180 was created, or alternatively reference the base version. The media content can have multiple different versions, some of which may have different presentation timelines (as discussed in more detail below). The particular range of another version, for instance the one currently being viewed by a user, to which the annotation corresponds can thus be readily determined based on the time range field 184 and time units field 186, in conjunction with the known relationship among the presentation timeline of the base version, the version being viewed, and the version on which the annotation was originally created.

It should be noted that the time ranges for different annotations can overlap. Thus, for example, a first annotation may correspond to a segment ranging between the first and fourth minutes of media content, a second annotation may correspond to a segment ranging between the second and seventh minutes of the media content, and a third annotation may correspond to a segment ranging between the second and third minutes of the media content.

Alternatively, rather than using the presentation timeline of the media content, different media characteristics can be used to associate the annotation with a particular segment(s) of the media content. For example, annotations could be associated with (or "anchored" on) specific objects in the video content, or specific events in the audio content.

Creation time field 188 contains data specifying the date and time at which annotation entry 180 is created. The time of creation of annotation entry 180 is absolute and is not relative to the video or audio content of the media stream to which annotation entry 180 is associated. Accordingly, a user can specify that annotations which are particularly old, e.g., created more than two weeks earlier, are not to be displayed. ABE 132 of FIG. 3 stores the creation time and date when the annotation is created.

Title field 190 contains data representing a title by which the annotation represented by annotation entry 180 is identified. The title is generally determined by the user and the user enters the data representing the title using conventional and well known user interface techniques. The data can be as simple as ASCII text or as complex as HTML code which can include text having different fonts and type styles, graphics including wallpaper, motion video images, audio, and links to other multimedia documents. The title is also referred to herein as the "subject" or "subject line" for the annotation.

Content field 192 contains data representing the substantive content of the annotation as authored by the user. The actual data can be stored in content field 192, or alternatively content field 192 may store a pointer to (or other indicator of) the content that is stored separately from the entry 180 itself. In the illustrated example, content field 192 includes a pointer to (or other identifier of) the annotation content, which in turn is stored in annotation content store 17. The user enters the data representing the content using conventional and well known user interface techniques. The content added by the user in creating annotation entry 180 can include any one or more of text, graphics, video, audio, etc. or links thereto. In essence, content field 192 contains data representing the substantive content the user wishes to include with the presentation of the corresponding media stream at the relative time range represented by time range field 184 and time units field 186.

In one implementation, annotations can be any media type with an associated OLE (object linking and embedding)-compliant viewer or editor, including both accepted versions of the OLE standard and proposed standards for future adoption. OLE specifies the way in which data (e.g., files or portions of files) can be linked to or embedded in another file (or portion of a file). Content field 192 can store the necessary linking and embedding information to link to or embed the data (files, documents, etc.) for the annotation. Further details about OLE are available from Microsoft Corporation of Redmond, Wash.

Annotation identifier field 194 stores data that uniquely identifies annotation entry 180, while related annotation identifier field 196 stores data that uniquely identifies a related annotation. Annotation identifier field 194 can be used by other annotation entries to associate such other annotation entries with annotation entry 180. In this way, threads of discussion can develop in which a second annotation responds to a first annotation, a third annotation responds to the second annotation and so on. By way of example, an identifier of the first annotation would be stored in related annotation identifier field 196 of the second annotation, an identifier of the second annotation would be stored in related annotation identifier field 196 of the third annotation, and so on.

Set identifier(s) field 198 stores data that identifies one or more sets to which annotation entry 180 belongs. Media content can have multiple sets of annotations, sets can span multiple media content, and a particular annotation can correspond to one or more of these sets. Which set(s) an annotation belongs to is identified by the author of the annotation. By way of example, media content corresponding to a lecture may include the following sets: "instructor's comments", "assistant's comments", "audio comments", "text comments", "student questions", and each student's personal comments.

Media content identifier field 200 contains data that uniquely identifies particular multimedia content as the content to which annotation entry 180 corresponds. Media content identifier 200 can identify a single media stream (either an individual stream or a composite stream), or alternatively identify multiple different streams that are different versions of the same media content. Media content identifier 200 can identify media versions in a variety of different manners. According to one embodiment, the data represents a real-time transport protocol (RTP) address of the different media streams. An RTP address is a type of uniform resource locator (URL) by which multimedia documents can be identified in a network. According to an alternate embodiment, a unique identifier is assigned to the content rather than to the individual media streams. According to another alternate embodiment, a different unique identifier of the media streams could be created by annotation server 10 of FIG. 3 and assigned to the media streams. Such a unique identifier would also be used by streaming media server 11 of FIG. 1 to identify the media streams. According to another alternate embodiment, a uniform resource name (URN) such as those described by K. Sollins and L. Mosinter in "Functional Requirements for Uniform Resource Names," IETF RFC 1733 (December 1994) could be used to identify the media stream.

User-defined property fields 202 are one or more user-definable fields that allow users (or user interface designers) to customize the annotation system. Examples of such additional property fields include a "reference URL" property which contains the URL of a web page used as reference material for the content of the annotation; a "help URL" property containing the URL of a help page which can be accessed concerning the content of the annotation; a "view script" property containing JavaScript which is to be executed whenever the annotation is viewed; a "display type" property, which gives the client user interface information about how the annotation is to be displayed; etc.

Sequence number 204 allows a user to define (via user interface 152 of FIG. 3) a custom ordering for the display of annotation identifiers, as discussed in more 8 detail below. Sequence number 204 stores the relative position of the annotations with respect to one another in the custom ordering, allowing the custom ordering to be saved for fixture used. In the illustrated example, annotation entry 180 stores a single sequence number. Alternatively, multiple sequence numbers 204 may be included in annotation entry 180 each corresponding to a different custom ordering, or a different annotation set, or a different user, etc.

Annotation Positioning

An annotation can be created by a user of any of the client computers 15 of FIG. 1. When a user is playing back multimedia content he or she can add an annotation to any temporal point or range of the content that he or she desires. Situations can arise, however, where the user does not realize that he or she wants to add an annotation until after the desired temporal point or beginning of the temporal range has passed. For example, a user may desire to add an annotation to a particular segment of a lecture. However, the playback of the lecture may be twenty seconds into the segment (or the segment may be over) before the user realizes that he or she wants to add the annotation. Manually searching back through the content to locate the correct temporal point where the annotation should begin can be a difficult and cumbersome process.

User interface module 152 of FIG. 3 assists the user in temporally positioning the annotation, including assisting the user in locating the correct or starting point for the annotation. Interface module 152 allows the user to scan back through the multimedia content by identifying the likely beginning points for new ideas or sentences. The user will typically want to set the starting point for an annotation to be the beginning of a sentence or new idea, so interface 152 allows the user to scan back through the multimedia content jumping from likely beginning point to likely beginning point (e.g., by selecting a "rewind" button). Alternatively, interface 152 may simply jump back to the first (or some other predetermined or dynamically determined number) likely beginning point and use that as the starting point for the annotation without requiring user input.

Interface module 152 communicates with web browser 153 or other multimedia presentation application that is presenting the multimedia content to access the multimedia content and locate likely beginning points for sentences or new ideas. Interface 152 can also communicate to web browser 153 (or other multimedia presentation application) to present the media content at a particular temporal location (e.g., a likely beginning point). It may also be necessary for interface 152 or web browser 153 to access media server 11 of FIG. 1 to obtain the data for previously-presented portions of the media content.

Likely beginning points for new ideas or sentences can be determined using a wide variety of techniques. Any one of these techniques can be used to determine likely beginning points, or alternatively multiple techniques may be combined. One such technique is referred to as "pause detection". In pause detection, the audio content is monitored to identify pauses in the audio presentation. Such pauses are selected as likely beginning points as new sentences or ideas are typically preceded by a pause when the presenter is speaking. Another such technique is referred to as "pitch analysis". In pitch analysis, the audio content is monitored to identify the relative pitch of the presenter's voice. When the presenter is talking about more important ideas or issues the pitch of his or her voice is often higher than when talking about less important ideas or issues. Thus, points where the pitch is higher are likely beginning points for new ideas.

Another such technique is to use conventional speech-to-text conversion techniques to convert the audio content to text. Conventional natural language processing techniques can then be used to identify sentence boundaries.

Yet another such technique is referred to as video frame analysis, in which the video content is monitored. In one implementation, frames of the video content are monitored for movement. For example, a speaker shown in the video content may move his or her hands a significant amount while speaking, and hold them relatively still during pauses. Thus, breaks between sentences or ideas could be identified by detecting breaks in movement of objects in the video content. By way of another example, any of a variety of conventional object recognition and tracking algorithms could be used to identify and track particular objects. Idea or subject breaks can be identified by detecting when the particular objects are no longer in view, or when they stop moving.

Additionally, user interface module 152 can similarly assist users in determining the ending point for an annotation. Situations can arise where the entire temporal range that the annotation should correspond to has been presented before the user selects to add an annotation. Interface module 152 can identify likely ending points in the same manner as likely beginning points are identified, allowing the user to scan back through the multimedia content jumping from likely ending point to likely ending point.

Figure 5:
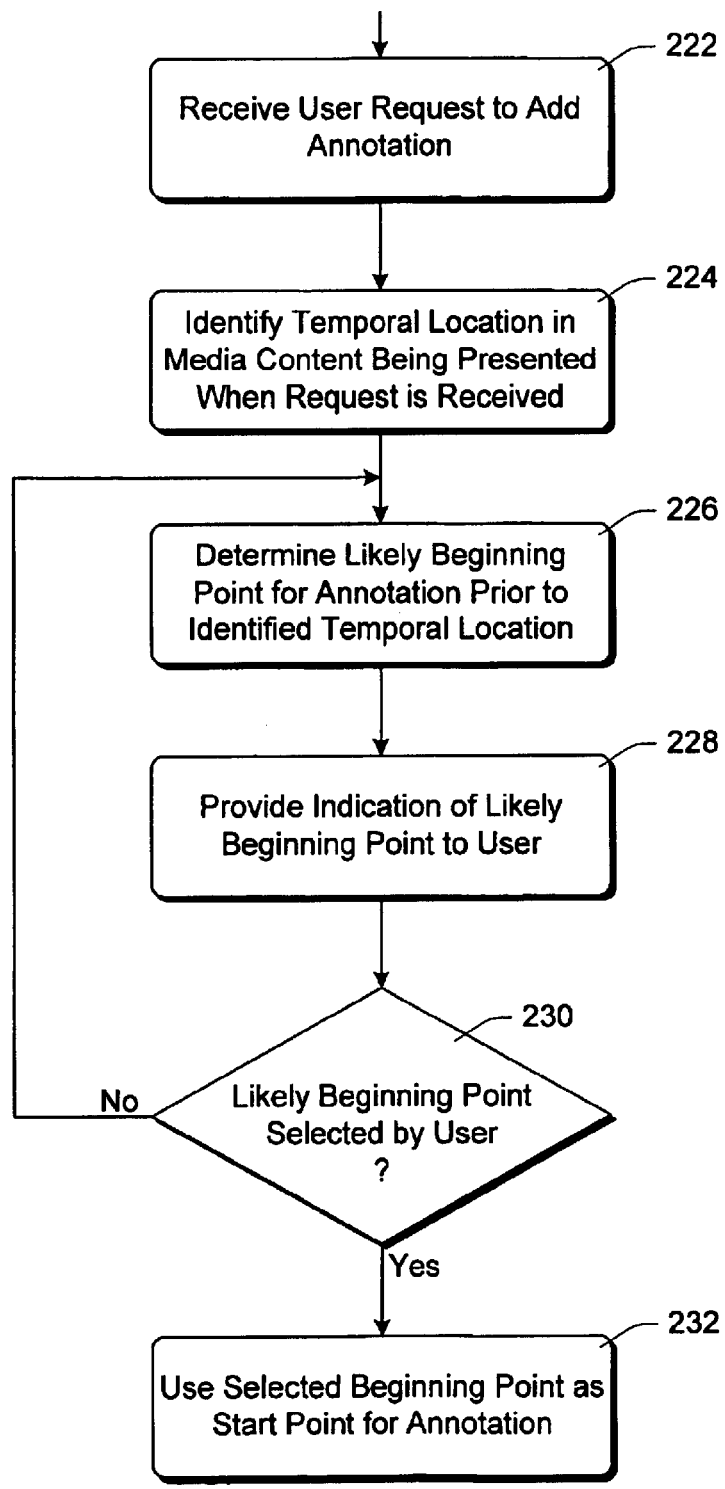
FIG. 5 is a flowchart illustrating an exemplary process for assisting a user in determining a starting point for an annotation.

FIG. 5 is a flowchart illustrating an exemplary process for assisting a user in determining a starting point for an annotation. The process shown in FIG. 5 is implemented by user interface module 152 of FIG. 3, and may be performed in software. These steps are described with additional reference to FIG. 3.

Initially, interface module 152 receives a user request to add a new annotation corresponding to media content being played back (step 222). Upon receipt of the request, interface 152 identifies the temporal location in the media content being presented at the time the request is received (step 224).

Interface 152 then accesses the media content (e.g., via web browser 153) and searches temporally back through the media content for a likely beginning point prior to the temporal location identified in step 224 (step 226). An indication of the likely beginning point is provided to the user, such as beginning playback of the media content at the likely beginning point, or presenting a frame of the video content that corresponds to the likely beginning point (step 228).

If the user selects the likely beginning point (step 230), such as by actuation of an on-screen button or menu option, then interface 152 uses the selected beginning point as the starting point for the annotation (step 232). Otherwise, interface 152 continues to determine likely beginning points (step 226) and provided indications of the points to the user (step 228), until eventually the user selects one.

Additionally, the process of FIG. 5 could be used to "scan" forward temporally rather than scan backwards. A user could scan forward to locate an ending point or beginning point for the annotation. For example, if a user were scanning backwards to identify the beginning point, the user may "overshoot" the desired starting point and begin scanning forward.

User Interface

An annotation can be created by a user of any of the client computers 15 of FIG. 1. As discussed above with reference to FIG. 3, client 15 includes an interface module 152 that presents an interface to a user (e.g., a graphical user interface (GUI)), allowing a user to make requests of annotation server 10. Numerous windows, dialog boxes, tool bars, etc. can be displayed to the user by interface module 152, as discussed in more detail below. In the illustrated embodiment, a user can access annotation server 10 via an annotation toolbar provided by interface 152.

The interface module 152 is an application program (or part of an application program) that is executed at client 15. The interface module 152 may be incorporated into the web browser, operating system, or run as part of a separate, self-contained application which can be stored locally at client 15 or alternatively received from a remote server (e.g., web page server 12 of FIG. 1) for execution at client 15. In any case, the interface module 152 operates in a graphical user interface windowing environment such as provided by the "Windows" brand of operating systems, available from Microsoft Corporation of Redmond, Wash.

Discussion is made herein of a user selecting or actuating graphical buttons or boxes, selecting menu or list options, etc. The user can perform such selection or actuation via any of a variety of conventional UI actuation mechanisms, such as using a cursor control device to position a pointer over the option or button to be selected or actuated and "clicking" on a button of the cursor control device, by tabbing (or using arrow keys) to the desired option or button and hitting the "enter" key on an alphanumeric keyboard, etc.

Figure 6:
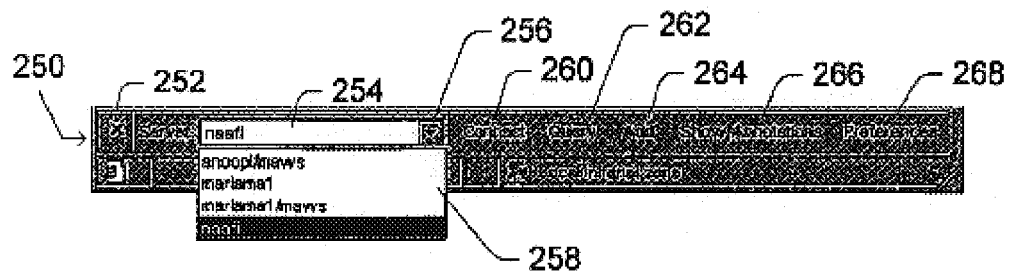
FIG. 6 illustrates an annotation toolbar in accordance with one embodiment of the invention.

FIG. 6 illustrates an annotation toolbar in accordance with one embodiment of the invention. Annotation toolbar 250 includes various identifying information and user-selectable options 252–268. Annotation toolbar 250 can be a stand-alone toolbar (e.g., a separate moveable and resizable window within a graphical user interface), or alternatively can be incorporated as part of another window (e.g., within a multimedia presentation window).

Selection of an exit or "X" button 252 causes interface 152 to terminate display of the toolbar 250. A server identifier 254 identifies the annotation server with which client 15 is currently configured to communicate (annotation server 10 of FIG. 1 in the illustrated embodiment). Selection of icon 256 causes interface 152 to display a drop-down or pull-down menu 0.258 allowing a user to select another annotation server.

Selection of a connection button 260 causes ABE 151 of FIG. 3 to establish a connection with the annotation server identified by identifier 254. Selection of a query button 262 causes interface module 152 to open a "query" dialog box, from which a user can search for particular annotations. Selection of an add button 264 causes interface module 152 to open an "add new annotation" dialog box, from which a user can create a new annotation.

Selection of a show annotations button 266 causes interface module 152 to open a "view annotations" dialog box, from which a user can select particular annotations for presentation.

Selection of a preferences button 268 causes interface 152 of FIG. 3 to open a "preferences" dialog box, from which a user can specify various UI preferences, such as an automatic server query refresh interval, or default query criteria values to be persisted between sessions.

Figure 7:
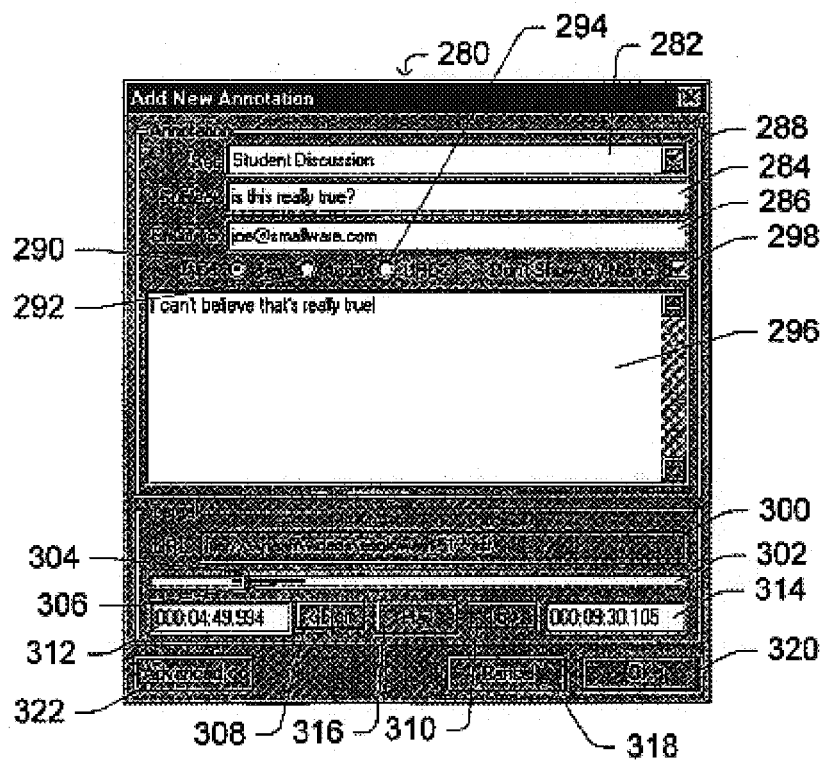
FIGS. 7, 8, 9, 10, and 11 illustrate exemplary dialog boxes for creating new annotations.

FIG. 7 shows an exemplary "add new annotation" dialog box 280 that allows a user to create a new annotation. Dialog box 280 can be presented, for example, in response to user selection of add button 264 of FIG. 6.

Dialog box 280 includes an annotation set identifier 282, a subject line 284, and an email field 286. Annotation set identifier 282 allows the user to identify a named set to which the new annotation will belong. This set can be a previously defined set, or a new set being created by the user. Selection of the particular set can be made from a drop-down menu activated by selection of icon 288, or alternatively can be directly input by the user (e.g., typed in using an alphanumeric keyboard). According to one embodiment of the invention, annotation server 10 of FIG. 3 supports read and write access controls, allowing the creator of the set to identify which users are able to read and/or write to the annotation set. In this embodiment, only those sets for which the user has write access can be entered as set identifier 282. Alternatively, rather than (or in addition to) user selection of an annotation set, one or more annotation sets may be inherently associated with dialog box 280 (or toolbar 250 of FIG. 6) and thus implicitly selected for each new annotation.

Subject line 284 allows the user to provide a short summary or title of the annotation content. Although the subject line is illustrated as being text, it could include any of a wide variety of characters, alphanumerics, graphics, etc. In the illustrated embodiment, subject line 284 is stored in the title field 190 of the annotation entry of FIG. 4.

Email field 286 allows the user to input the email address of a recipient of the annotation. When an email address is included, the newly created annotation is electronically mailed to the recipient indicated in field 286 in addition to being added to the annotation database. Additional information regarding such email messages is also maintained by annotation server 10, such as the recipients of the email messages, the time and date the messages were sent, etc.

Dialog box 280 further includes an annotation type selector in the form of radio buttons 290, 292, and 294, selection of which creates text annotation, an audio annotation, or a uniform resource locator (URL) annotation, respectively. Although not shown, other types of annotations could also be accommodated, such as graphics, video, etc. The content of the annotation is input to annotation field 296, which is text in the illustrated example of FIG. 7.

Dialog box 280 also includes a checkbox 298 that allows the user to create an anonymous annotation. When checkbox 298 is selected (as illustrated in FIG. 7), the author of the annotation is not stored in author field 182 of FIG. 4. Annotation backend 151 can simply not forward the author information to annotation server 10 of FIG. 3, or alternatively annotation server 10 may simply ignore the author information.

Interface 152 assumes that the current media stream being presented to the user is the media stream to which the new annotation will be associated. The media stream to which an annotation is associated is referred to as the "target" of the annotation. An identifier of this stream is displayed in a target specification area 300 of dialog box 280. Alternatively, a user could change the target of the annotation, such as by typing in a new identifier in target area 300, or by selection of a "browse" button (not shown) that allows the user to browse through different directories of media streams.

A time strip 302 is also provided as part of dialog box 280. Time strip 302 represents the entire presentation time of the corresponding media stream. A "thumb" 304 that moves within time strip 302 indicates a particular temporal position within the media stream. The annotation being created via dialog box 280 has a begin time and an end time, which together define a particular segment of the media stream. This segment is illustrated as darkened portion 306 of time strip 302. When "from" button 308 is selected, thumb 304 represents the begin time for the segment relative to the media stream. When "to" button 310 is selected, thumb 304 represents the end time for the segment relative to the media stream. Alternatively, two different time bars could be displayed, one for the begin time and one for the end time. The begin and end times are also displayed in an hours/minutes/seconds format in boxes 312 and 314, respectively.

Thumb 304 can be moved along time strip 302 in any of a variety of conventional manners. For example, a user can depress a button of a mouse (or other cursor control device) while a pointer is "on top" of thumb 304 and move the pointer along time strip 302, causing thumb 304 to move along with the pointer. The appropriate begin or end time is then set when the mouse button is released. Alternatively, the begin and end times can be set by entering (e.g., via an alphanumeric keyboard) particular times in boxes 312 and 314.

In one implementation, interface module 152 assists the user in locating a beginning point and/or an ending point for the annotation using thumb 304. In this implementation, interface module 152 determines likely beginning and/or ending points as the user moves thumb 304 along time strip 302 and causes thumb 304 to move to positions in time strip 302 from likely beginning (or ending) point to likely beginning (or ending) point. Thus, interface module 152 causes thumb 304 to move along in a "jumping" manner, limiting the locations along time strip 302 where thumb 304 can be placed. For each likely beginning (or ending) point, interface module 152 also updates box 312 and/or 314 with the presentation time at that point, and also forwards a request to web browser 153 (or other multimedia presentation application) to display the frame of video content at that point.

Dialog box 280 also includes a "play" button 316. Selection of play button 316 causes interface module 152 of FIG. 3 to forward a segment specification to web browser 153 of client 15. The segment specification includes the target identifier from target display 300 and the begin and end times from boxes 312 and 314, respectively. Upon receipt of the segment specification from interface module 152, the browser communicates with media server 11 and requests the identified media segment using conventional HTTP requests. In response, media server 11 streams the media segment to client 15 for presentation to the user. This presentation allows, for example, the user to verify the portion of the media stream to which his or her annotation will correspond.

Dialog box 280 also includes a cancel button 318, an OK button 320, and an advanced button 322. Selection of cancel button 318 causes interface 152 to close the dialog box 280, canceling out of the add new annotation process. Selection of OK button 320 causes interface 152 to forward the information entered in dialog box 280 to annotation backend 151, which sends the new annotation information to annotation server 10 of FIG. 3. Interface 152 then closes dialog box 280, the new annotation being entered.

Selection of "advanced" button 322 causes interface 152 to display a different dialog box for adding new annotations which reduces the number of options available to the user. The reduced option dialog box is discussed in more detail below with reference to FIG. 8. The advanced button included in many of the button dialog boxes described herein operates as a toggle button between a full-option dialog box (e.g., for advanced users) and a reduced option dialog box (e.g., for novice users).

Figure 8:
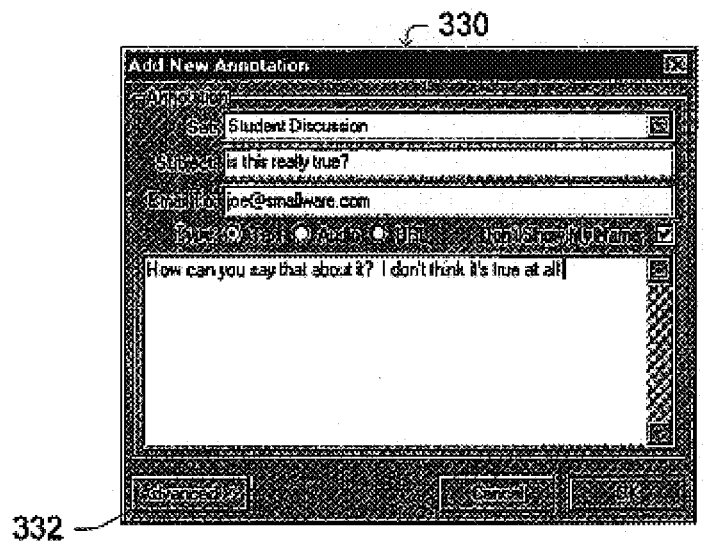

FIG. 8 shows another exemplary "add new annotation" dialog box 330. Dialog box 330 is similar to dialog box 280 of FIG. 7, but is a reduced option box. As illustrated, dialog box 330 includes much of the same information and fields as dialog box 280 of FIG. 7. However, the target stream information and begin and end time information for the annotation is not included (e.g., fields 300–316 of FIG. 7 are not included in dialog box 330).

By reducing the options and information available in dialog box 330, a more simplified dialog box for adding annotations is displayed to the user. Dialog box 330 also includes an advanced button 332, selection of which causes interface 152 to display dialog box 280 of FIG. 7 (which includes the additional options and information). When switching between the full option dialog box 280 of FIG. 7 and the reduced option dialog box 330 of FIG. 8, any information entered by the user in one dialog box is displayed in the corresponding field in the other dialog box (assuming such a field is displayed in the other dialog box).

Figure 9:
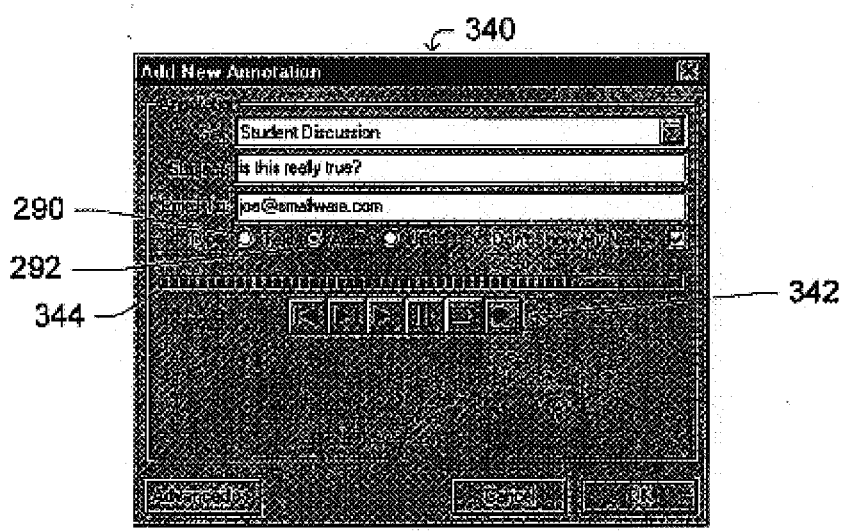

FIG. 9 shows another exemplary "add new annotation" dialog box 340. Dialog box 340 is similar to dialog box 330 of FIG. 8, except that dialog box 340 is for adding an audio annotation rather than a text annotation. As illustrated, radio button 292 is selected for audio data rather than radio button 290. Dialog box 340 includes input controls 342 and an audio display bar 279. Input controls 342 include conventional audio control buttons such as fast forward, rewind, play, pause, stop and record. Selection of the various individual control buttons allows the user to record, playback, erase, etc. the audio input he or she desires to be the annotation content. Audio display bar 344 provides visual progress feedback when the audio is playing or recording, indicating how much of the recorded audio has been played back or recorded.

Figure 10:
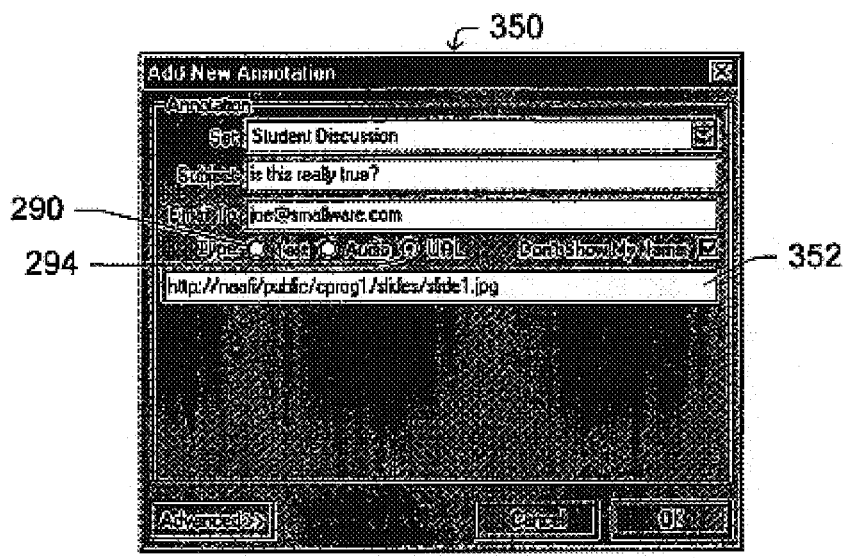

FIG. 10 shows another exemplary "add new annotation" dialog box 350. Dialog box 350 is similar to dialog box 330 of FIG. 8, except that dialog box 340 is for adding an URL annotation rather than a text annotation. As illustrated, radio button 294 is selected for an URL annotation rather than radio button 290. Dialog box 350 includes an annotation field 352 into which the content of the annotation (an URL) can be entered by the user (e.g., by typing on an alphanumeric keyboard).

Figure 11:
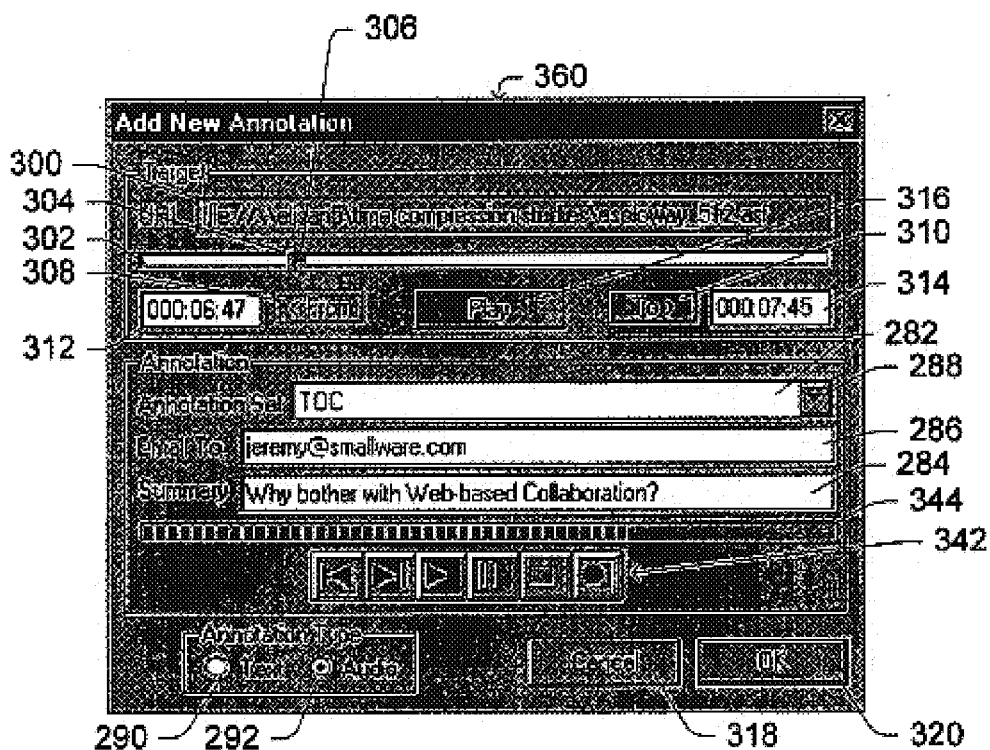
Figure 12:
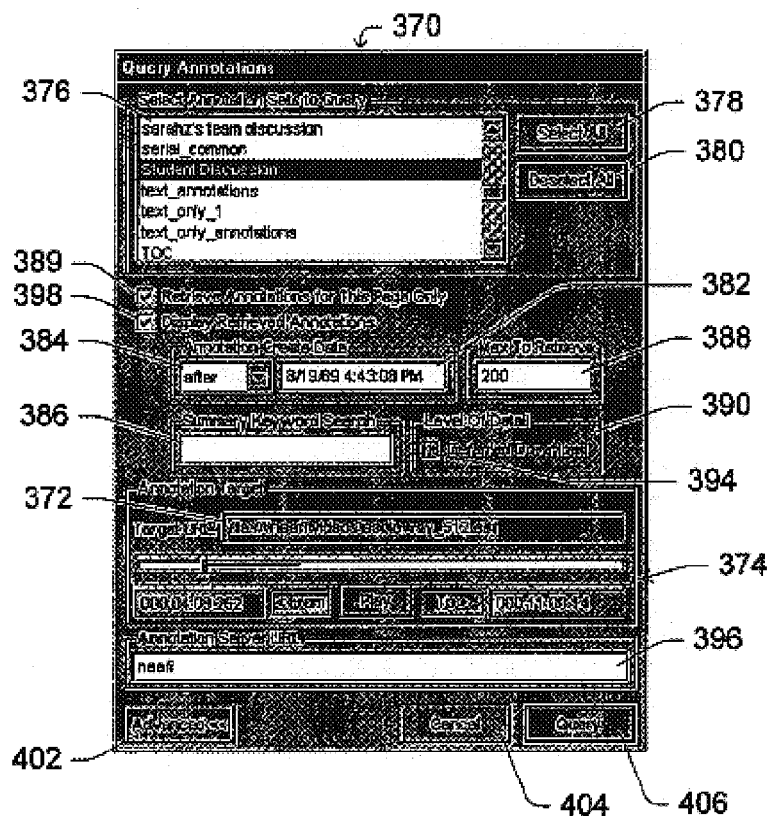
FIGS. 12, 13, and 14 illustrate exemplary dialog boxes for querying annotations.

FIG. 11 shows another exemplary "add new annotation" dialog box 360. Dialog box 360 includes much of the same information and fields for an audio annotation as dialog box 280 of FIG. 7 and dialog box 340 of FIG. 9. However, the information and fields are arranged differently in dialog box 360. FIG. 12 shows a "query annotations" dialog box 370 that results from a user selecting query button 262 of FIG. 6. Many of the options and fields presented to the user in dialog box 370 are similar to those presented in the "add new annotation" dialog box 280 of FIG. 7, however, those in dialog box 370 are used as search criteria rather than data for a new annotation.

Dialog box 370 includes a target display 372 that contains an identifier of the target stream. This identifier can be input in any of a variety of manners, such as by typing in a new identifier in target display 372, or by selection of a "browse" button (not shown) that allows the user to browse through different directories of media streams. In the illustrated embodiment, the identifier is an URL. However, 8 alternate embodiments can use different identifier formats.

Dialog box 370 also includes target information 374, which includes a time strip, thumb, "from" button, "to" button, "play" button, and begin and end times, which are analogous to the time strip, thumb, "from" button, "to" button, "play" button, begin and end times of dialog box 280 of FIG. 7. The begin and end times in target information 374 limit the query for annotations to only those annotations having a time range that corresponds to at least part of the media segment between the begin and end times of target information 374.

Dialog box 370 also includes an annotation set list 376. Annotation set list 376 includes a listing of the various sets that correspond to the target media stream. According to one implementation, only those sets for which an annotation has been created are displayed in set list 376. According to one embodiment of the invention, annotation server 10 of FIG. 3 supports read and write security, allowing the creator of the set to identify which users are able to read and/or write to the annotation set. In this embodiment, only those sets for which the user has read access are displayed in set list 376.

A user can select sets from annotation set list 376 in a variety of manners. For example, using a mouse and pointer to "click" on a set in list 376, which highlights the set to provide feedback to the user that the set has been selected. Clicking on the selected set again de-selects the set (leaving it no longer highlighted). Additionally, a "select all" button 378 allows a user to select all sets in set list 376, while a "deselect all" button 380 allows a user to de-select all sets in set list 376.

Alternatively, rather than (or in addition to) user selection of an annotation set, one or more annotation sets may be inherently associated with dialog box 370 and thus implicitly selected for each new annotation.

In the illustrated embodiment, the sets displayed as part of annotation set list 376 contain annotations which correspond to the target identifier in target display 372. However, in alternate embodiments the sets in list 376 need not necessarily contain annotations which correspond to the target identifier in target display 372. Interface module 152 allows a user to select different target streams during the querying process. Thus, a user may identify a first target stream and select one or more sets to query annotations from for the first target stream, and then identify a second target stream and select one or more sets to query annotations from for the second target stream.

Additional search criteria can also be input by the user. As illustrated, fields 382 and 384 allow a particular creation date and time identifier to be input along with a temporal relation (e.g., "after" or "before"). Similarly, a summary keyword search field 386 allows particular words, phrases, characters, graphics, etc. that must appear in the summary (or subject, title, annotation content, etc.) to be input. A maximum number of annotations to retrieve in response to the query can also be selected in maximum field 388. Furthermore, the query can be limited to only annotations that correspond to the target identifier in target display 372 by selecting check box 389.

A level of detail 390 to retrieve can also be selected by the user. Examples of different levels that could be retrieved include the "full level" (that is, all content of the annotation), or a "deferred download" where only an identifier of the annotations (e.g., a summary or title) is downloaded. In the illustrated example, selection of checkbox 394 selects the deferred download level, whereas if checkbox 394 is not selected then the full level of detail is implicitly selected.

A server identifier 396 identifies the annotation server with which client 15 is currently configured to communicate. Different annotation servers can be selected by the user by inputting the appropriate identifier as server identifier 396. This input can be provided in any of a variety of manners, such as by typing in a new identifier in server identifier 396 or by selection of a "browse" button (not shown) that allows the user to browse through different directories of annotation servers.

A user can request automatic display of the retrieved annotations by selecting a "display retrieved annotations" checkbox 398. Selection of "advanced" button 402 reduces the number of options available to the user, simplifying dialog box 370. The reduced option dialog box is discussed in more detail below with reference to FIG. 13.

The user can cancel out of the query process at any time by selecting cancel button 404. The user can then complete the query process by selecting a query button 404. Upon selection of the query button 406, interface 152 closes the query dialog box 370 and forwards the search criteria to annotation server 10. Additionally, if checkbox 398 is selected then interface 152 displays a "view annotations" dialog, as discussed in more detail below.

Figure 13:
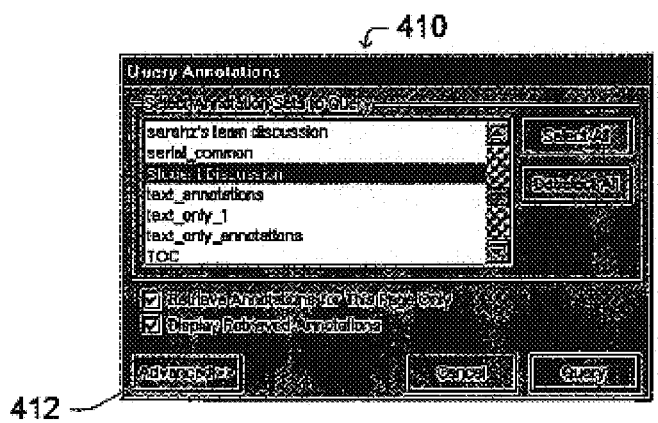

FIG. 13 shows another exemplary "query annotations" dialog box 410. Dialog box 410 is similar to dialog box 370 of FIG. 12, but is a reduced option box. As illustrated, dialog box 410 includes much of the same information and fields as dialog box 370 of FIG. 12. However, the target stream information, and begin and end time information for the annotation, and additional search criteria are not included in dialog box 410.

By reducing the options and information available in dialog box 410, a more simplified dialog box for querying annotations is displayed to the user. Dialog box 410 also includes an advanced button 412, selection of which causes interface 152 to display dialog box 370 of FIG. 12, which includes the additional fields and information. When switching between the fill option dialog box 370 of FIG. 12 and the reduced option dialog box 410 of FIG. 13, any information entered by the user in one dialog box is displayed in the corresponding field in the other dialog box (assuming such a field is displayed in the other dialog box).

Figure 14:
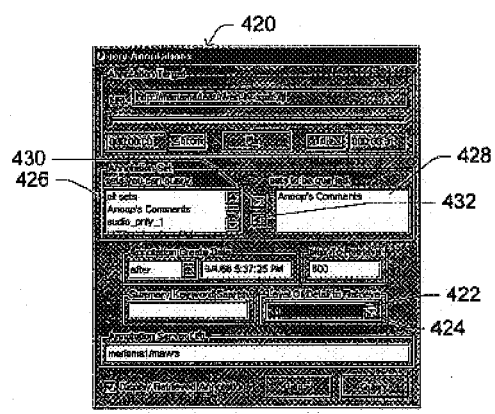

FIG. 14 shows another exemplary "query annotations" dialog box 420. Dialog box 420 includes much of the same information and fields for querying annotations as dialog box 370 of FIG. 12. However, the information and fields are arranged differently in dialog box 420.

In dialog box 420, a level of detail 422 to retrieve can be selected by the user. Different levels can be selected from a drop-down or pull-down menu by selecting icon 424. Examples of different levels that could be retrieved include the "full level" (that is, all content of the annotation), a "summary only" level, a "user identifier only" level, a "preview" level including only the first 512 bytes of data, etc.

Additionally, annotation sets are displayed in a different manner in dialog box 420 than in dialog box 370 of FIG. 12. Dialog box 420 includes an annotation set list 426 and an annotation set selection list 428. Annotation set list 426 includes a listing of the various sets that correspond to the target media stream. According to one implementation, only those sets for which an annotation has been created are displayed in set list 426. According to one embodiment of the invention, annotation server 10 of FIG. 3 supports read and write security, allowing the creator of the set to identify which users are able to read and/or write to the annotation set. In this embodiment, only those sets for which the user has read access are displayed in selection list 426.

A user can select sets from annotation set list 426 to create selection list 428. Selection list 428 identifies the sets that will be searched when the query input process is complete. Sets can be moved between set list 426 and selection list 428 in a variety of manners. For example, using a mouse and pointer to "click" on a set in list 426 (which may also highlight the set) and then clicking on a right arrow button 430 would cause interface 152 to add that set to selection list 428. Similarly, clicking on a set in selection list 428 and then clicking on a left arrow button 432 would cause interface 152 to remove that set from selection list 428. By way of additional examples, sets may be moved from one list to another in a "drag and drop" manner, or by simply single-clicking or double-clicking on the appropriate set.

Figure 15:
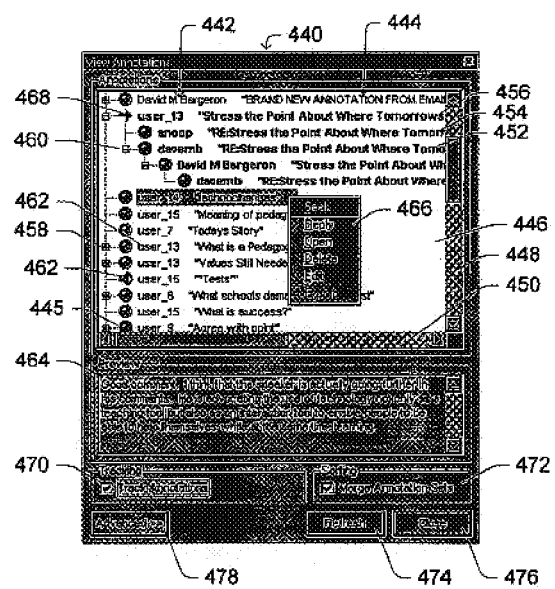

FIG. 15 shows a dialog box 440 that identifies annotations corresponding to one or more annotation sets. The identified annotations are the result of the query input by the user as discussed above with reference to FIGS. 12–14, or 2 alternatively by selection of show annotations button 266 of FIG. 6. In the 3 illustration of FIG. 15, annotation identifiers in form of user identifiers 442 and subject lines 444 are displayed within an annotation listing box 446. The user can scroll through annotation identifiers in a conventional manner via scroll bars 448 and 450. The annotation identifiers are presented in annotation listing box 446 according to a default criteria, such as chronological by creation time/date, by user, alphabetical by summaries, etc. Icons identifying the type of annotation are also displayed in listing box 446, such as a circle 445 to represent text and a microphone 447 to represent audio.

Related annotations are displayed in an annotation listing 446 in a hierarchical, horizontally offset manner. The identifier of an annotation that is related to a previous annotation is "indented" from that previous annotation's identifier and a connecting line between the two identifiers is shown. For example, the annotations identified by identifiers 452 and 454 are both related to the previous annotation identified by identifier 456. Expansion icons 458 are used to allow the user to display the identifiers of related annotations, while reduction icons 460 are used to allow the user to hide the identifiers of related applications. For example, an expansion icon 458 indicates to the user that additional related annotations exist for the annotation identified by identifier 462.

By selecting a particular annotation identifier from annotation listing 446 (e.g., "single clicking" on the summary using the left mouse button), preview information is presented in a preview section 464, and a selection box or menu 466 is provided. The exact nature of the preview information is dependent on the amount of information that was requested (e.g., as identified in level of detail 422 of FIG. 14).

Selection box 466 provides various user-selectable features related to the annotation whose identifier is selected, including "seek", "reply", "open", "delete", and "edit". Selection of the "seek" feature causes interface module 152 of FIG. 3 to initiate presentation of the media segment corresponding to the annotation (analogous to the play button 316 of FIG. 7 discussed above). Selection 8 of the "reply" feature allows the user to create a new annotation that is related to the selected annotation. The new annotation will be displayed offset horizontally from the selected annotation, analogous to annotations 452 and 456 discussed above.

Selection of the "open" feature causes interface module 152 of FIG. 3 to request all of the annotation content for the selected annotation from annotation server 10. Selection of the "delete" feature causes interface module 152 to remove the selected annotation from annotation listing 446. In one embodiment, removal of a particular annotation also causes removal of all related annotations (e.g., deleting the annotation identified by identifier 456 would also cause deletion of the annotations identified by identifiers 452 and 454). Selection of the "edit" feature causes interface module 152 to display another dialog box allowing the user to edit the content of the annotation, as discussed in more detail below. When enabled, selection of the "export" feature (which is shadowed and thus not enabled in the illustrated example) causes interface module 152 to display a "file save" dialog box via which the user could save the annotation as a word processing document (e.g., as a Microsoft Word word processing document). This saved document would contain the various meta data and annotation content as described above with reference to annotation entry 180 of FIG. 4.

Dialog box 440 can be displayed concurrently with a multimedia player that is presenting multimedia content that corresponds to the annotations in annotation listing 446. Interface module 152 can have the annotations "track" the corresponding multimedia content being played back, so that the user is presented with an indication as to which annotation(s) correspond to the current temporal position of the multimedia content. An arrow 468 is used to identify the annotation with a begin time closest to the current temporal position of the multimedia content. As the multimedia content is played back and another annotation has a begin time closer to the current temporal position than the annotation identified by identifier 456, then arrow 468 will be advanced to that other annotation. Tracking can be enabled by selecting checkbox 470, or disabled by de-selecting checkbox 470.

Figure 18:
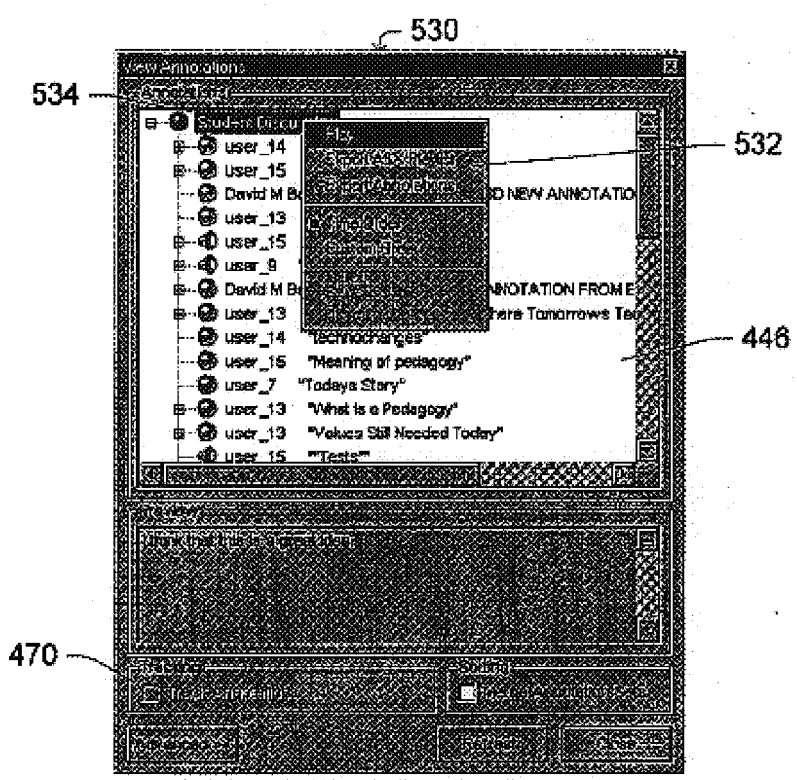

Dialog box 440 also includes a merge annotation sets button 472. Selection of merge annotation sets button 472 causes interface module 152 to present annotations in a chronological order regardless of what set(s) the annotations in annotation listing 446 belong to. If button 472 is not selected, then annotations from different sets are grouped and displayed together in annotation listing 446 (e.g., under a tree item, such as identifier 534 as illustrated in FIG. 18 below).

Dialog box 440 also includes a refresh button 474, a close button 476, and an advanced button 478. Selection of refresh button 474 causes interface module 152 to communicate with annotation back end 151 to access annotation server 10 and obtain any additional annotations that correspond to the query that resulted in listing box 446.

Selection of close button 476 causes interface 152 to terminate the display of dialog box 440. Selection of advanced button 478 causes interface 152 to display a different view annotations box having additional details, as discussed in more detail below with reference to FIG. 16.

FIG. 16 shows another exemplary "view annotations" dialog box 490. Dialog box 490 includes much of the same information for viewing annotations as 7 dialog box 440 of FIG. 15. However, the information is arranged differently in dialog box 490, and additional information and options are also displayed. When switching between the full option dialog box 490 of FIG. 16 and the reduced option dialog box 440 of FIG. 15, any information entered by the user in one dialog box is displayed in the corresponding field in the other dialog box (assuming such a field is displayed in the other dialog box).

The additional information displayed in dialog box 490 includes summary preferences 492, target preferences 494, and an annotation target identifier 496. Summary preferences 492 allow a user to select the identifying information he or she would like included in annotation list 446. Summary preferences 492 include checkboxes allowing the user to select to show the author, the annotation set, the creation date, the annotation subject, or any combination thereof. Annotation target identifier 496 identifies the target multimedia content for the annotations listed in annotation list 446.

Target preferences 494 include seek options 498 and checkbox 500. Seek options 498 allow the user to select from various options the resultant behavior from seeking to an annotation (e.g., by selecting "seek" in menu 466 of FIG. 15). Additional options can be selected via a drop-down or pull-down menu by initiates playback of the multimedia content at the temporal position corresponding to the begin time of the annotation and continuing until the end of the multimedia content; "seek and play annotation", which plays back only the temporal segment of the multimedia content identified by the begin and end times of the annotation; "seek and skip to next", which plays the temporal segment of the multimedia content identified by the begin and end times of the annotation, then jumps to play the temporal segment of the next annotation in annotation listing 446 (and continually jumping to the next temporal segment when the current temporal segment end time is reached).

Dialog box 490 also includes an advanced button 504, which causes interface module 152 to display a view annotations dialog box having less information and/or options, such as dialog box 440 of FIG. 15.

FIG. 17 shows another exemplary "view annotations" dialog box 520. Dialog box 520 includes much of the same information for viewing annotations as dialog box 440 of FIG. 15. However, interface module 152 has disabled the merge annotation sets 472 (which causes interface module 152 to re-render the annotations so that the annotations from the same set are displayed grouped together under a tree item with the name of the set as its title, such as "Student Discussion") and track annotations 470 options. Additionally, menu 522 includes different options than those included in menu 466 of FIG. 15. Specifically, menu 522 includes a "navigate" option rather than a "seek" option. The "navigate" option is similar to the "seek" option discussed above in menu 466, however the "navigate" option is used when the annotation does not correspond to the current media content being targeted by client 15 (FIG. 3). Selection of the "navigate" option causes user interface module 152 to instruct web browser 153 to navigate to the media content to which the annotation corresponds, making that the current targeted media content.

FIG. 18 shows another exemplary "view annotations" dialog box 530. Dialog box 530 includes much of the same information for viewing annotations as dialog box 440 of FIG. 15. However, interface module 152 has disabled the track annotations 470 option, and menu 532 includes different options than those included in menu 466 of FIG. 15. Menu 532 is displayed rather than menu 466 of FIG. 15 or menu 522 of FIG. 17 when an identifier 534 of an annotation set is selected from list 446 rather than an annotation, and the "merge annotation sets" checkbox 472 of (FIG. 15, 16, or 17) is unchecked.

Menu 532 includes the following options: play, export ASX playlist, export annotations, time order, custom order, save, and reset. Selection of the play option causes playback of the multimedia content to begin starting with the selected annotation in annotation list 446. Selection of the "export ASX playlist" option causes annotation backend 151 to output a record (e.g., create a file) that identifies the temporal segments of multimedia content that the annotations identified in list 446 correspond to, as determined by the begin and end times of the annotations. Selection of the "export annotations" option causes annotation backend 151 to output a record (e.g., create a file) that includes the annotation content of each annotation identified in list 446.

Selection of the "time order" option causes interface module 152 to display the identifiers in list 446 in chronological order based on the begin time for each annotation. Selection of the "custom order" option allows the user to identify some other criteria to be used in determining the order of the identifiers in list 446 (e.g., identifiers can be re-ordered in a conventional drag and drop manner). Re-ordering annotation identifiers causes the sequence numbers 204 (of FIG. 4) of the annotations to be re-ordered accordingly. Selection of the "save" option causes interface module 152 to save the current custom ordering to annotation server 10 of FIG. 3 by saving the current sequence numbers of the annotations. Selection of the "reset" option causes interface module 152 to ignore any changes that have been made since the last saved custom ordering and revert to the last saved custom ordering.

Figure 19:
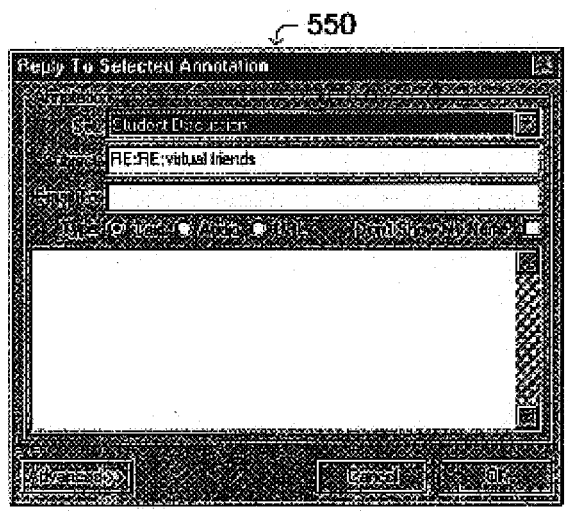
FIG. 19 illustrates an exemplary dialog box for reply to an annotation.

FIG. 19 illustrates an exemplary "reply to annotation" dialog box 550. Reply to annotation dialog box 550 is displayed in response to a user request to create another new annotation by replying to a previous annotation, such as selection of the "reply" option in menu 466 of FIG. 15. Dialog box 550 includes information and fields for adding a new annotation, analogous to dialog box 330 of FIG. 8.

Figure 20:
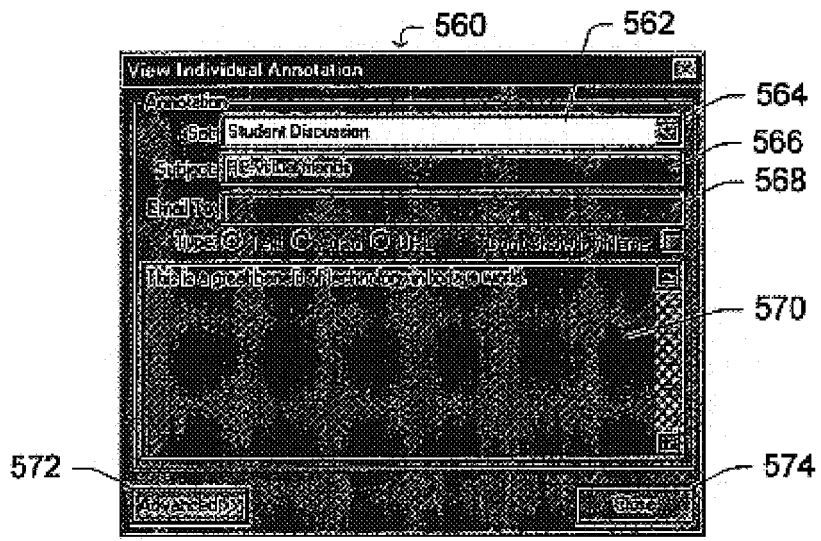
FIG. 20 illustrates another exemplary dialog box for viewing an annotation.

FIG. 20 illustrates an exemplary "view annotation" dialog box 560. View annotation dialog box 560 is displayed in response to a user request to open an individual annotation, such as by selection of the "open" option in menu 466 of FIG. 15.

Dialog box 560 includes the set information 562 for the annotation. Identifiers of other sets that the annotation corresponds to can be viewed by selecting icon 564. Dialog box 560 also includes a subject 566 of the annotation as well as which email recipients 568 the annotation was sent to. The content of the annotation is displayed in content area 570.

Dialog box 560 also includes an advanced button 572 and close button 574. Advanced button 572 provides additional information regarding the annotation, such as an identifier of the corresponding media content, a display of the temporal range of the media content that the annotation corresponds to, etc. Close button 574 causes interface module 152 to terminate display of dialog box 560.

Figure 21:
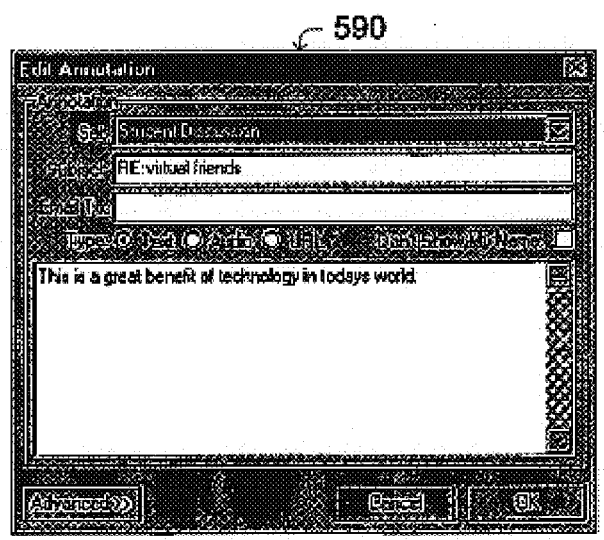
FIG. 21 illustrates an exemplary dialog box for editing annotations.

FIG. 21 illustrates an exemplary "edit annotation" dialog box 590. Edit annotation dialog box 590 is displayed in response to a user request to edit an annotation, such as selection of the "edit" option in menu 466 of FIG. 15. Dialog box 590 includes information and fields displaying the current information for the annotation, analogous to dialog box 560 of FIG. 20. New information can be entered into the fields, analogous to add annotation dialog box 330 of FIG. 8. In the illustrated example, existing email addresses cannot be altered and new email addresses cannot be entered.

Figure 22:
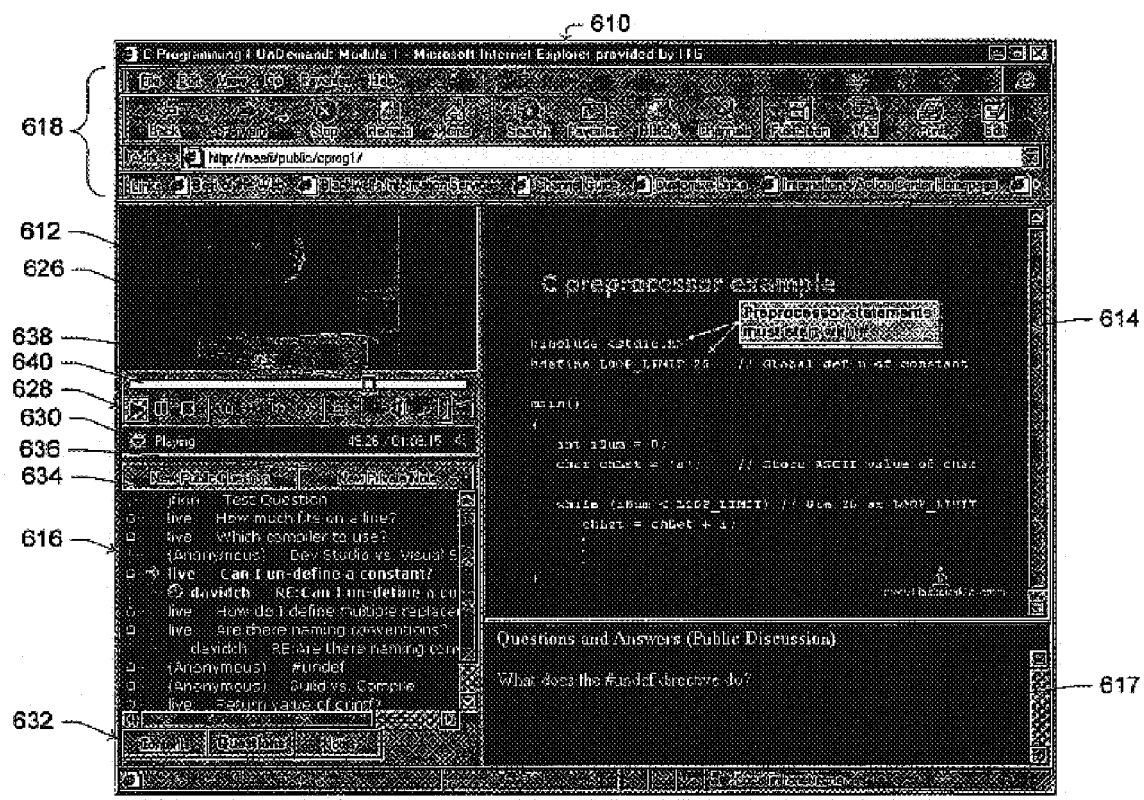
FIGS. 22 and 23 illustrate exemplary graphical user interface windows that concurrently display annotations and corresponding multimedia content.

FIG. 22 illustrates an exemplary graphical user interface window 610 that concurrently displays annotations and corresponding multimedia content. Window 610 includes a media portion 612, an annotation content portion 614, an annotation identifier portion 616, an annotation preview portion 617, and command bars 618.

Media portion 612 includes a media screen 626, shuttle and volume controls 628 and content information space 630. Media screen 626 is the area within which visual content of the multimedia content is rendered. For non-visual content, screen 626 can display static or dynamic images representing the content, or alternatively be left blank or simply not included in window 610. Shuttle and volume controls 628 are included to allow the user to playback, pause, stop, fast forward, rewind the multimedia presentation, as well as to alter the volume of the multimedia presentation. Content information space 630 lists information pertaining to the multimedia presentation being rendered on screen 626, such as the tracking/timing data for the presentation.

Annotation content portion 614 is the region of window 610 within which visual annotations are rendered. For video, graphical, and text annotations, the video, graphical, or text content of the annotation is displayed on screen 614. For non-visual annotations, portion 614 can display static or dynamic images representing the annotation content, or alternatively can be left blank or simply not included in window 610. In the illustrated example, portion 614 displays slides that correspond to the visual content displayed in media portion 612, each slide being a URL annotation. Each such URL annotation contains a URL to one of the slides, and previewing the annotation causes the preview window to navigate to the URL, thus displaying the slide.

Annotation identifier portion 616 is the region of window 610 within which identifiers for the annotations are displayed, analogous to FIGS. 15–18 above. Additional buttons 632 identify different annotation sets that correspond to the multimedia content being presented in media portion 612. In the illustrated example, three different annotation sets are included (the "contents" set, the "questions" set, and the "notes" set). User selection of a button 632 causes interface module 152 to display the annotation identifiers for annotations in the set corresponding to the selected button. One of the buttons 632 is highlighted or otherwise identified as the current set being referenced in portion 616, which is the "questions" annotation set in the illustrated example.

Annotation preview portion 617 is a preview window for the annotations identified in portion 616. Visual content (if any) of whatever annotation is selected or tracked in portion 616 is displayed in preview portion 617 (analogous to preview section 464 of FIG. 15).

Portion 616 also includes add annotation buttons 634 and 636. One or more annotation sets are inherently associated with each of the annotation buttons 634 and 636, so selection of one of buttons 634 or 636 causes interface 152 to display an "add new annotation" dialog box (e.g., one from FIGS. 7–11) with the annotation set automatically set. Alternatively, an "add new annotation" dialog box may be displayed that includes no entry for annotation set identification. In the illustrated example, the "New Public Question" button 634 is associated with the "questions" annotation set, while the "New Private Note" button 636 is associated with the "notes" annotation set.

Command bars 618 list familiar UI and web browsing commands, such as "File", "Edit", "Print", URLs, etc.

A user can browse through the visual content of media portion 612 using shuttle controls 628 or by moving "thumb" 638 along slider bar 640, which automatically synchronizes the display of the slides in annotation content 614 and the identifiers in annotation identifier portion 616 with the current seek point in the video. Alternatively, double-clicking on or "seeking" to any of the annotations (via the identifiers in annotation identifier portion 616) can be used as a navigational tool as well.

Figure 23:

FIG. 23 illustrates another exemplary graphical user interface window 650 that concurrently displays annotations and corresponding multimedia content. Window 650 is similar to window 610 of FIG. 22 and includes much of the same information and screens.

However, window 650 illustrates the "contents" annotation set being illustrated in portion 616, and the "contents" button being identified as the current set being referenced in portion 616.

Additionally, interface module 152 of FIG. 3 can communicate with the web browser 153 or other multimedia presentation application. In the illustrated example of FIG. 23, the annotation being displayed in portion 614 is another video presentation (of which only one frame is shown in FIG. 23). When interface module 152 begins displaying the video presentation in portion 614, it sends a pause request to the multimedia presentation application to pause the presentation of the multimedia content. Thus, as illustrated in FIG. 23, the multimedia presentation on screen 626 is paused. When the annotation video presentation is completed (or stopped by the user) interface module 152 sends a play request to the multimedia presentation application to resume presentation of the multimedia content.

Figure 24:
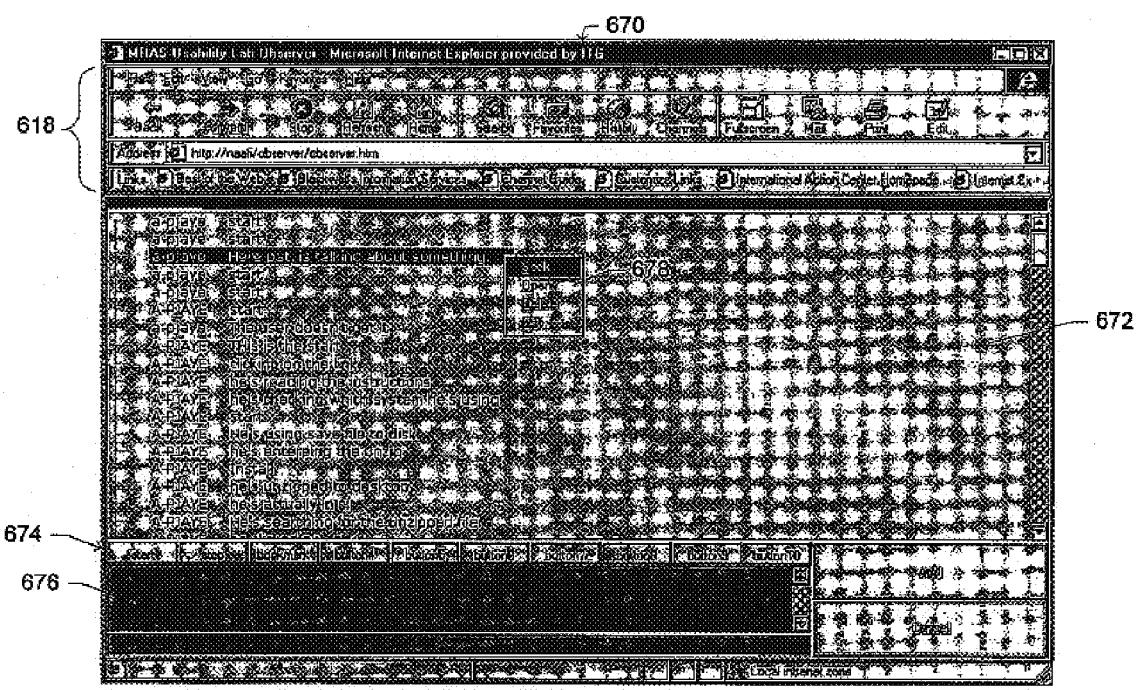
FIGS. 24, 25, and 26 illustrate exemplary customized graphical user interface windows.

FIG. 24 illustrates an exemplary customized graphical user interface window 670. Window 670 includes command bars 618, annotation identifier portion 672, configurable buttons 674, and annotation content portion 676. Command bars 618 list familiar UI and web browsing commands as discussed above with reference to FIG. 23.

Identifiers of the annotations corresponding to the target multimedia content are displayed in annotation identifier portion 672, analogous to FIGS. 15–18 discussed above. Visual content of an annotation identified by an annotation identifier selected in portion 672 is displayed in annotation content portion 676.

Configurable buttons 674 are user-configurable buttons that can be configured by the user to carry out any of a wide variety of actions that he or she desires. In the illustrated example, window 670 is intended to be used as an "observation" window via which an individual observing another individual's behavior (e.g., during software testing) can enter comments and notes for later use. Any such comments or notes are added as an annotation and are not made available to the individual being observed (e.g., by blocking access rights to the appropriate annotation set or adding them to a video stream that is not visible to the individual being observed). By configuring the buttons 674 to actions that the observer is likely to use frequently, the interface is made more user-friendly and allows the observer to record common comments and/or notes by simply clicking on the appropriate customized buttons.

In the illustrated example of FIG. 24, buttons 674 include ten user-definable buttons, of which only three have been defined. As part of the definition process, the user provides a title for the button that is displayed as part of window 670. The three buttons that have been defined are labeled "start", "stop", and "bookmark".

The meaning of these buttons and their associated actions are dependent on how they have been programmed. For example, the "start", and "stop" buttons may simply create new annotations with the subjects of "start" and "stop", respectively, with "start" and "stop" having some intrinsic meaning to the user 17 no annotation content or body would be included. The "bookmark" button may create a new annotation with a predetermined subject and content to be entered by the user when the annotation is created.

Selecting one of the annotation identifiers in portion 672 (e.g., by "right clicking" on the identifier) brings up a menu 678 providing various options to the user, analogous to menu 466 of FIG. 15.

Figure 25:
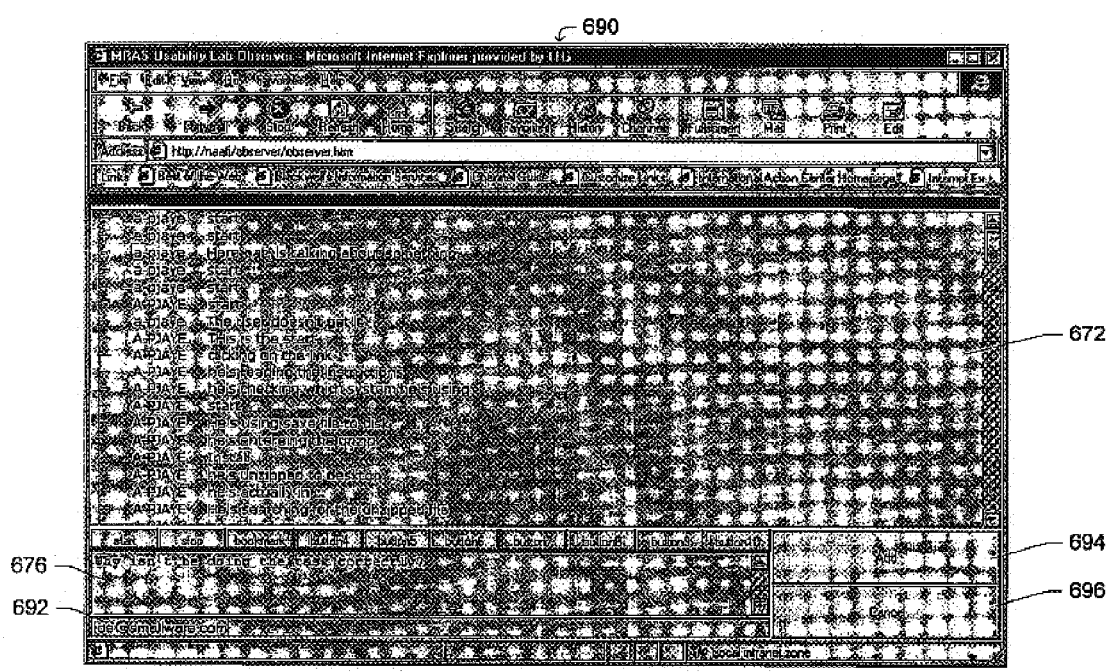

FIG. 25 illustrates another exemplary customizable graphical user interface window 690. Window 690 is similar to window 670 of FIG. 24 and includes much of the same information and buttons.

However, in window 690 a new annotation is being entered with the annotation content being input in content portion 676. Interface module 152 also provides an email field 692 via which the user can input an email address of a recipient(s) for the new annotation. Once the user has finished entering the new annotation content and email addresses, the user can select the add button 694 to forward the annotation to annotation server 10 of FIG. 3, thereby adding the new annotation to the database. Alternatively, the user can cancel out of the add annotation process by selecting cancel button 696, which causes interface module 152 to clear the annotation content portion 676 and the email field 692.

Figure 26:
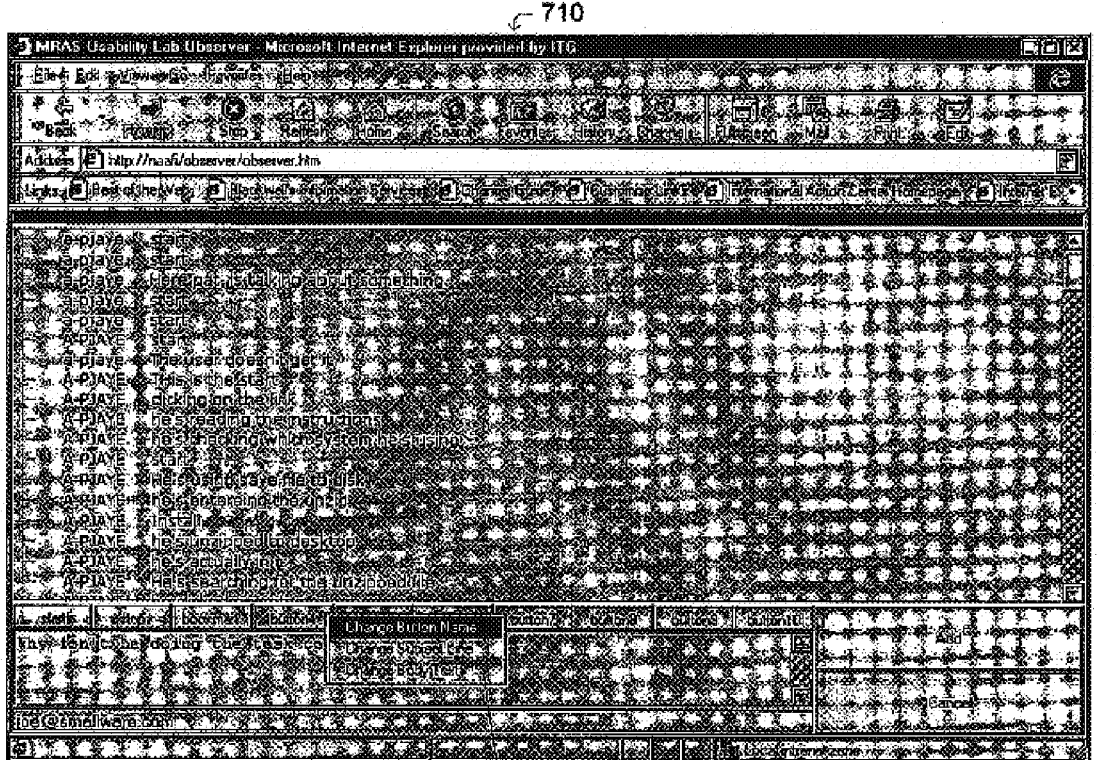

FIG. 26 illustrates another exemplary customizable graphical user interface window 710. Window 710 is similar to window 690 of FIG. 25 and includes much of the same information and buttons. However, FIG. 26 also illustrates a menu 712 that can be displayed by user selection of one of the buttons (e.g., "right clicking" on the button). In the illustrated example, menu 712 is displayed in response to the user right-clicking on button 4.

Menu 712 provides three options, including "change button name", "change subject line", and "change body text". The user can change the name of the button as displayed in window 710 by selecting the "change button name" option. Similarly, the user can change the subject line of a new annotation that is created when the button is selected by selecting the "change subject line" option. Similarly, the user can change the annotation content of the new annotation that is created when the button is selected by selecting the "change body text" option.

CONCLUSION

The invention presents a user-friendly interface for creating and viewing annotations corresponding to multimedia presentations. The user interface advantageously facilitates user creation of new annotations and subsequent user viewing of annotations. Additionally, in one implementation the interface advantageously assists the user in determining the temporal positioning of new annotations.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A networked client/server system, comprising:
   a network annotation server;
   a network media server;
   a client that communicates with both the annotation server and the media server over a data communications network;
   multimedia content available from the media server;
   a plurality of annotations, corresponding to the multimedia content, available from the annotation server, each of the plurality of annotations including annotation content and a temporal range identifier that identifies a segment of the multimedia content to which the annotation corresponds; and
   wherein the client supports a graphical user interface that presents a plurality of annotation identifiers corresponding to the multimedia content and that enables a user to request selected ones of the plurality of annotations, based on the plurality of annotation identifiers, and to render the requested annotations.

2. A system as recited in claim 1, wherein the graphical user interface further includes a plurality of user-configurable buttons, whereupon selection of one of the plurality of user-configurable buttons a user-defined action corresponding to the selected button is taken.

3. A system as recited in claim 1, wherein each annotation identifier of the plurality of annotation identifiers comprises an annotation subject line of an annotation corresponding to the multimedia content.

4. A graphical user interface for adding annotations to an annotation database from a network client, the graphical user interface comprising:

an annotation content field via which a user can enter content for a new annotation to the network client; and an annotation type selector presenting a plurality of annotation media types, whereupon selection of one of the plurality of annotation types causes the network client to change presentation of the annotation content field based on the selected annotation type.

5. A graphical user interface as recited in claim 4, wherein the plurality of annotation types include a text option, an audio option, and a uniform resource locator (URL) option.

6. A graphical user interface as recited in claim 4, wherein the annotation content field comprises a uniform resource locator (URL) field when an URL type is selected.

7. A graphical user interface as recited in claim 4, wherein the annotation content field comprises a text entry field when a text type is selected.

8. A graphical user interface as recited in claim 4, wherein the annotation content field comprises, when an audio type is selected, a plurality of audio controls including one or more of: record, stop, pause, play, fast forward, and rewind.

9. A graphical user interface as recited in claim 4, wherein the plurality of annotation type selector comprises a radio button for each of the plurality of annotation types.

10. A graphical user interface as recited in claim 4, further comprising an email field to identify a recipient to receive an email notification of the new annotation.

11. A graphical user interface as recited in claim 4, further comprising an add button, whereupon selection of the add button causes the network client to forward the content from the annotation content field to an annotation server to be added to an annotation database.

12. A graphical user interface as recited in claim 4, further comprising temporal range information identifying a segment of media content to which the annotation corresponds.

13. A graphical user interface as recited in claim 4, further comprising an input option that allows the user adding the new annotation to remain anonymous.

14. A graphical user interface at a network client to search for annotations corresponding to media content in an annotation database, the graphical user interface comprising:

an annotation set selector via which a user can identify one or more of a plurality of annotation sets to be searched;

a search criteria portion via which a user can identify search criteria; and a query button, wherein actuation of the query button causes the network client to forward identifiers of the identified one or more annotation sets and the identified search criteria to an annotation server to search the annotation database.

15. A graphical user interface as recited in claim 14, wherein the search criteria portion includes an annotation creation date entry field.

16. A graphical user interface as recited in claim 14, further comprising a detail level selector via which a user can indicate an amount of data to be displayed for each annotation that matches the search criteria.

17. A graphical user interface at a network client to search for annotations corresponding to media content in an annotation database, the graphical user interface comprising:

an annotation set selector via which a user can identify one or more of a plurality of annotation sets to be searched;

a search criteria portion via which a user can identify search criteria;

a target check box, whereupon selection of the target check box causes the network client to add, as an additional search criteria, a media content identifier; and a query button, wherein actuation of the query button causes the network client to forward the identified one or more annotation sets and the identified search criteria to an annotation server to search the annotation database.

18. A graphical user interface for viewing, at a network client, annotations corresponding to media content, the graphical user interface comprising:

an annotation identifier list via which an identifier for each of a plurality of annotations corresponding to the media content is displayed, the identifier including an indication of a type of content included in the annotation;

an actuation mechanism to enable a user to select one of the annotation identifiers, wherein selection of one of the annotation identifiers causes the network client to highlight the annotation identifier.

19. A graphical user interface as recited in claim 18, wherein the type of content includes one or more of: audio content, text content, video content, and uniform resource locator (URL) content.

20. A graphical user interface as recited in claim 18, wherein the identifier for an annotation includes one or more of: an indication of an author of the annotation, an indication of an annotation set that the annotation belongs to, an indication of a date the annotation was created, and a summary of the annotation.

21. A graphical user interface as recited in claim 18, further comprising a mechanism to identify a particular identifier that corresponds to an annotation of the plurality of annotations with a temporal range having a beginning time closest to a current presentation time of the media content.

22. A graphical user interface as recited in claim 21, wherein the mechanism comprises an arrow.

23. A graphical user interface as recited in claim 18, further comprising a preview portion via which annotation content for a selected one of the plurality of annotations is displayed.

24. A graphical user interface as recited in claim 18, further comprising a menu including a plurality of options identifying criteria to be used to order the annotation identifiers in the annotation identifier portion, whereupon selection of one of the plurality of options by a user causes the network client to arrange the annotation identifiers in the annotation identifier list in accordance with the criteria of the selected option.

25. A graphical user interface presented by an interface module, the graphical user interface comprising:

an annotation content portion via which annotations corresponding to video content are presented to a user;

an annotation identifier portion that identifies a plurality of annotations corresponding to the video content, wherein the annotation identifier portion identifies each of the plurality of annotations by an annotation subject line; and an input button, wherein user selection of the input button causes the interface module to create a new annotation.

26. A graphical user interface as recited in claim 25, wherein the annotation identifier portion further includes a visual identification of a current one or more annotations of the plurality of annotations that are temporally closest to a current playback position of the video content.

27. A graphical user interface as recited in claim 25, further comprising a plurality of user-configurable buttons, whereupon selection of one of the plurality of user-configurable buttons a user-defined action corresponding to the selected button is taken.

28. A graphical user interface as recited in claim 25, further comprising a media portion via which video content is displayed to a user.

29. A graphical user interface as recited in claim 25, wherein the interface module creates the new annotation by forwarding content for the new annotation to an annotation server.

30. A method comprising:
presenting a user interface at a client computer the user interface enabling a user to add a new annotation corresponding to media content;
receiving a user request to add the new annotation;
forwarding information for the new annotation to an annotation server, the information including data associated with the user interface;
analyzing at least a portion of the media content to identify a likely temporal location of the media content to associate the new annotation with; and
presenting the likely temporal location to the user via the user interface.

31. A method as recited in claim 30, wherein the data associated with the user interface comprises an annotation set identifier.

32. One or more computer-readable memories containing a computer program that is executable by a processor to perform the method recited in claim 30.

33. A method comprising:
presenting a user interface at a client computer, the user interface enabling a user to add a new annotation corresponding to media content;
receiving a user request to add the new annotation;
analyzing at least a portion of the media content to identify a likely temporal location of the media content to associate the new annotation with; and
presenting the likely temporal location to the user via the user interface.

34. A method as recited in claim 33, wherein the likely temporal location comprises a likely beginning temporal location of the media content to associate the new annotation with.

35. A method as recited in claim 33, further comprising:
receiving an acceptance or rejection of the likely temporal location from the user via the user interface;
using, in response to receiving an acceptance from the user, the likely temporal location as the temporal location of the media content to associate the new annotation with; and
analyzing, in response to receiving a rejection from the user, at least another portion of the media content to identify another likely temporal location of the media content to associate the new annotation with, and presenting the other likely temporal location to the user via the user interface.

36. A method as recited in claim 35, wherein the portion of the media content and the other portion of the media content are two different portions of the media content.

37. A method as recited in claim 33, further comprising using the likely temporal location as the temporal location of the media content to associate the new annotation with.

38. A method as recited in claim 33, wherein the presenting comprises displaying a video frame of the media content corresponding to the likely temporal location.

39. A method as recited in claim 33, wherein the presenting comprises displaying a presentation time of the media content that corresponds to the likely temporal location.

40. A method as recited in claim 33, wherein the analyzing comprises analyzing audio content.

41. A method as recited in claim 33 wherein the analyzing comprises analyzing video content.

42. One or more computer-readable memories containing a computer program that is executable by a processor to perform the method recited in claim 33.

43. A method comprising:
presenting a graphical user interface at a client computer, the graphical user interface enabling a user to add a new annotation corresponding to media content;
receiving a user request to add the new annotation;
presenting, to the user via the graphical user interface, a plurality of likely temporal locations of the media content to associate the new annotation with; and
receiving a user selection of one of the plurality of likely temporal locations to be the temporal location of the media content to associate the new annotation with.

44. A method as recited in claim 43, wherein the presenting the plurality of likely temporal locations comprises identifying a different one of the plurality of likely temporal locations to the user each time the user actuates a rewind button of the user interface.

45. A method as recited in claim 43, wherein the presenting comprises, for each of the plurality of likely temporal locations, displaying a visual indication of the likely temporal location.

46. A method as recited in claim 45, wherein the visual indication includes one or more of a video frame of the media content, a numerical presentation time of the media content, and an indicator on a graphical time bar.

47. One or more computer-readable memories containing a computer program that is executable by a processor to perform the method recited in claim 43.

48. One or more computer-readable media having stored thereon a computer program that, when executed by one or more processors, causes the one or more processors to perform functions including:
presenting a graphical user interface at a client computer, the graphical user interface enabling a user to add a new annotation corresponding to media content;
receiving a user request to add the new annotation;
identifying a user request time that is a time, with reference to the presentation time of the media content, that the user request is received; and
selecting, based on the user request time, a presentation time of the media content to associate the new annotation with, wherein the presentation time is a different time than the user request time.

49. One or more computer-readable media as recited in claim 48, wherein the selecting comprises selecting a begin time and an end time of the media content to define a segment of the media content to associate the new annotation with, and wherein the begin time is prior to the user request time and the end time is subsequent to the user request time.

50. One or more computer readable media having stored thereon a plurality of instructions that, when executed by a processor, causes the processor to:
present a plurality of annotation identifiers corresponding to multimedia content that enable a user to request selected ones of the plurality of annotations, based on the plurality of annotation identifiers, each of the plurality of annotations including annotation content and a temporal range identifier that identifies a segment of the multimedia content to which the annotation corresponds, and each of the plurality of annotations being available from an annotation server; and
render the requested annotations.

* * * * *